(12) United States Patent
Gamberoni et al.

(10) Patent No.: US 11,375,697 B2
(45) Date of Patent: Jul. 5, 2022

(54) RATIONAL HIVE STRUCTURE

(71) Applicants: Alessandro Gamberoni, Comerio (IT); Gianmario Riganti, Oggiona con Santo Stefano (IT)

(72) Inventors: Alessandro Gamberoni, Comerio (IT); Gianmario Riganti, Oggiona con Santo Stefano (IT)

( * ) Notice: Subject to any disclaimer, the term of this patent is extended or adjusted under 35 U.S.C. 154(b) by 174 days.

(21) Appl. No.: 16/604,731

(22) PCT Filed: Apr. 4, 2018

(86) PCT No.: PCT/EP2018/059405
§ 371 (c)(1),
(2) Date: Oct. 11, 2019

(87) PCT Pub. No.: WO2018/189302
PCT Pub. Date: Oct. 18, 2018

(65) Prior Publication Data
US 2021/0161107 A1 Jun. 3, 2021

(30) Foreign Application Priority Data
Apr. 12, 2017 (EP) ...................................... 17166379

(51) Int. Cl.
*A01K 59/00* (2006.01)
*A01K 47/00* (2006.01)

(52) U.S. Cl.
CPC .............. *A01K 59/00* (2013.01); *A01K 47/00* (2013.01)

(58) Field of Classification Search
CPC ......... A01K 47/00; A01K 47/02; A01K 47/06
See application file for complete search history.

(56) References Cited

U.S. PATENT DOCUMENTS

| 22,059 | A | * | 11/1858 | Blood | .................... | A01K 47/00 449/39 |
| 110,517 | A | * | 12/1870 | Walker | .................. | A01K 47/06 449/22 |

(Continued)

FOREIGN PATENT DOCUMENTS

| CH | 257646 A | 10/1948 |
| CN | 205455340 U | 8/2016 |

(Continued)

OTHER PUBLICATIONS

Translation of CN205865597.*

(Continued)

*Primary Examiner* — Peter M Poon
*Assistant Examiner* — Shada Mohamed Alghailani

(57) ABSTRACT

The present invention relates to a rational hive structure (1) comprising a nest comb box (2) delimiting a brood chamber for bees; a top cover (4) located in an upper portion of the hive structure to close an upper access to the hive structure; a lower closure element (5) located in a lower portion of the hive structure to close a bottom access to the hive structure; and a plurality of comb frames (6) in the form of substantially flat bodies extending in a main plane. Each comb frame includes peripheral element or bars (7) delimiting an inner comb area (8), wherein the inner comb area (8) has an overall dimension of at least 15 dm².

16 Claims, 15 Drawing Sheets

(56) References Cited

U.S. PATENT DOCUMENTS

| | | | | |
|---|---|---|---|---|
| 129,464 | A | * | 7/1872 | Cunningham ......... A01K 47/06 449/22 |
| 212,047 | A | * | 2/1879 | Parker .................... A01K 47/02 449/37 |
| 221,284 | A | * | 11/1879 | Connolly ................ A01K 47/02 449/35 |
| 2,300,772 | A | * | 11/1942 | Borland ................. A01K 47/00 449/36 |
| 4,349,927 | A | * | 9/1982 | Adams, IV ............ A01K 47/00 449/32 |
| 4,402,099 | A | | 9/1983 | Platt, Jr. |
| 4,546,509 | A | * | 10/1985 | Huetter .................. A01K 47/00 449/7 |
| 4,639,962 | A | | 2/1987 | Hogg |
| 5,162,014 | A | | 11/1992 | Moore et al. |
| 2013/0005216 | A1 | | 1/2013 | Rittberger |
| 2014/0127969 | A1 | * | 5/2014 | Mullins .................. A01K 53/00 449/7 |
| 2016/0015007 | A1 | | 1/2016 | Sinanis |
| 2016/0212976 | A1 | * | 7/2016 | Bulanyy ................ A01K 47/06 |
| 2017/0000092 | A1 | * | 1/2017 | Domocsok ............. A01K 49/00 |
| 2017/0055501 | A1 | * | 3/2017 | Forte ...................... A01K 47/02 |
| 2017/0208779 | A1 | * | 7/2017 | Rubright ................ A01K 47/02 |
| 2018/0116182 | A1 | * | 5/2018 | Frey ....................... A01K 47/06 |

FOREIGN PATENT DOCUMENTS

| | | | |
|---|---|---|---|
| CN | 205865597 | U * | 1/2017 |
| DE | 8026761 | U1 | 3/1981 |
| DE | 202006020178 | U1 | 2/2008 |
| GB | 1561745 | A | 2/1980 |
| IT | 1065362 | B | 2/1985 |
| NL | 1033172 | C2 | 4/2009 |
| RU | 2481769 | A | 5/2013 |
| WO | 0243475 | A1 | 6/2002 |
| WO | 2006118438 | A1 | 11/2006 |
| WO | 2013091018 | A1 | 6/2013 |
| WO | 2016083855 | A2 | 6/2016 |

OTHER PUBLICATIONS

International Search Report and Written Opinion of the International Searching Authority for application PCT/EP2018/059405, European Patent Office, Rijswijk, Netherlands, dated Aug. 27, 2018.

* cited by examiner

FIG.1
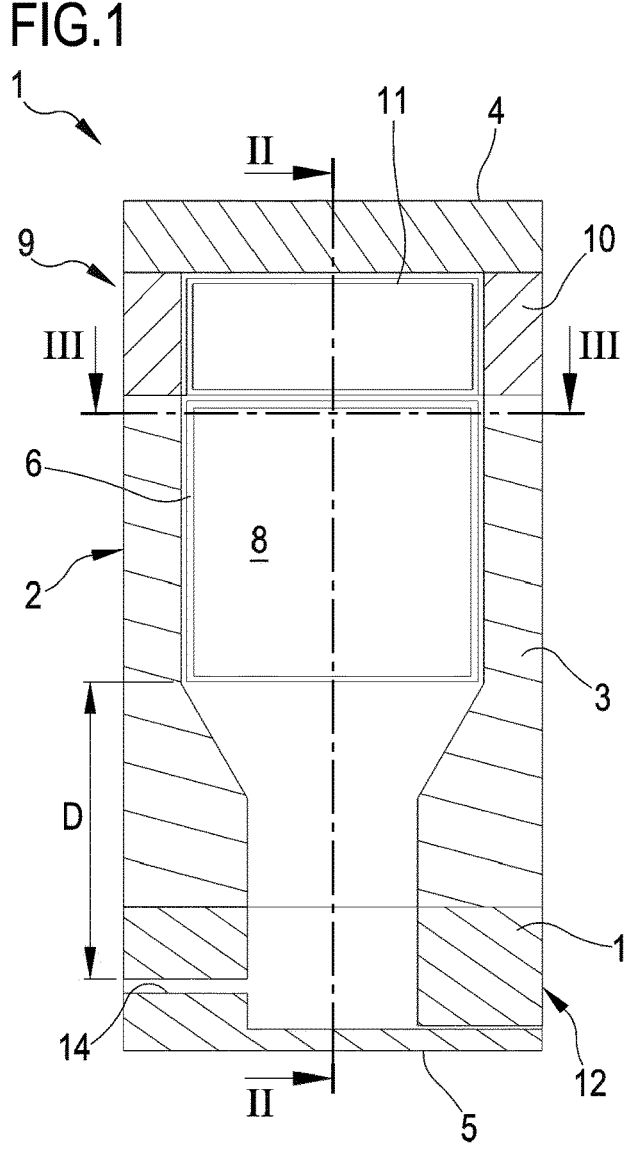
FIG.2
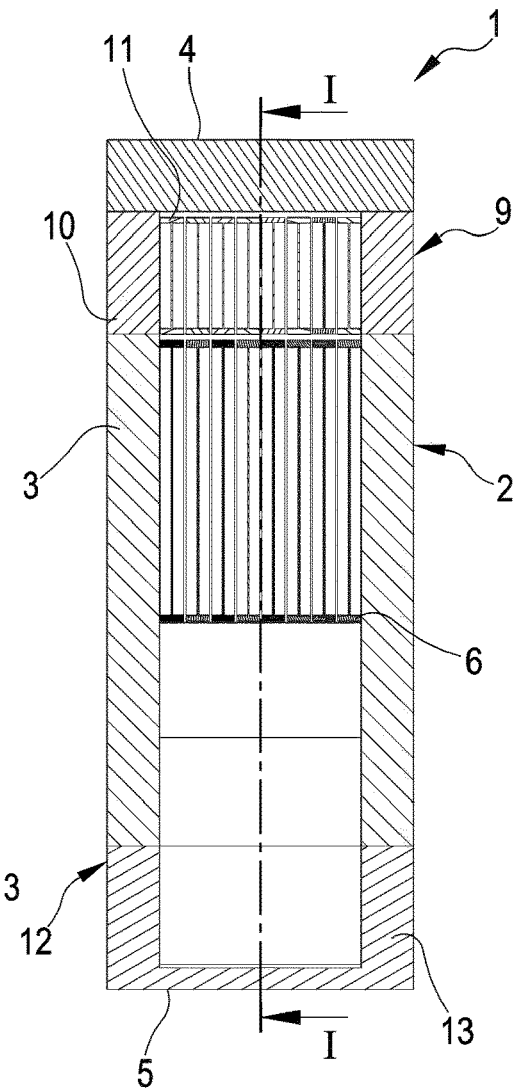
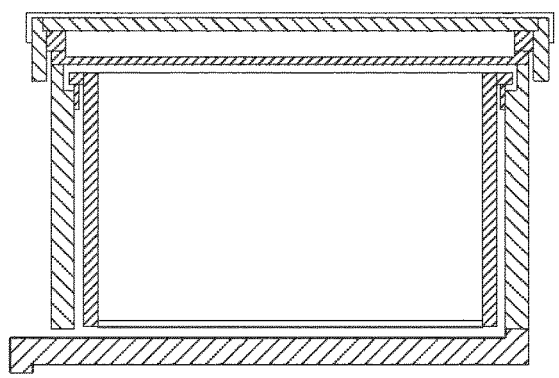
FIG.1A (Prior art)
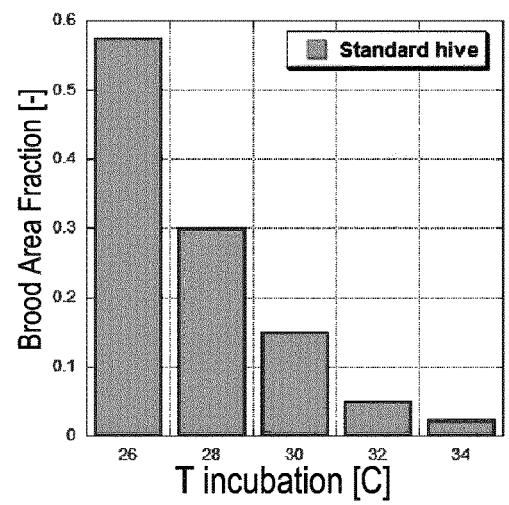
FIG.1B (Prior art)

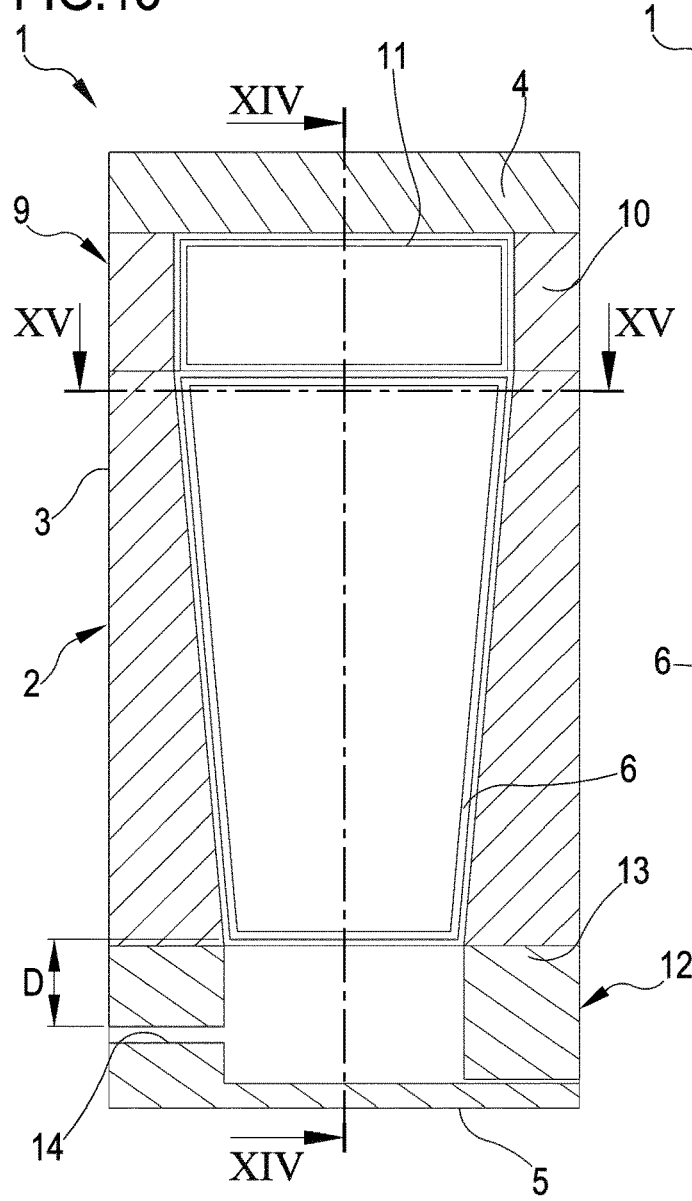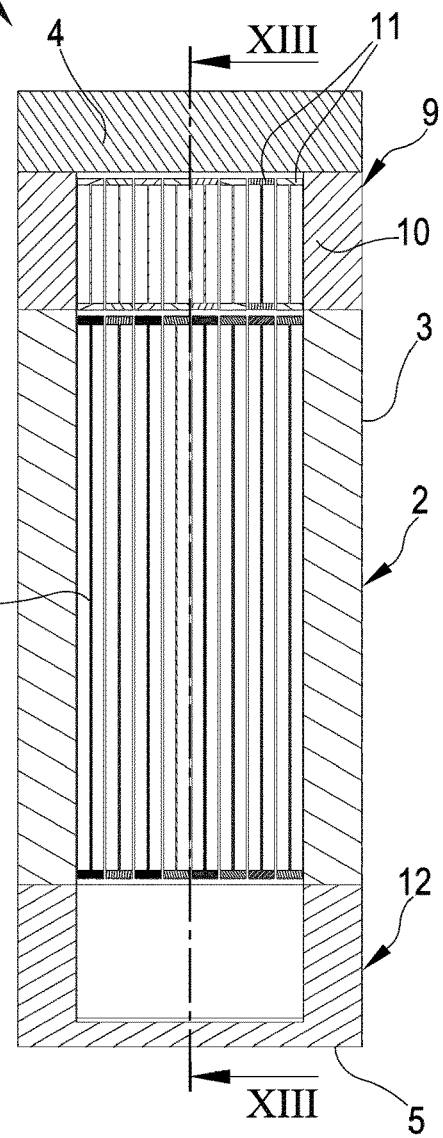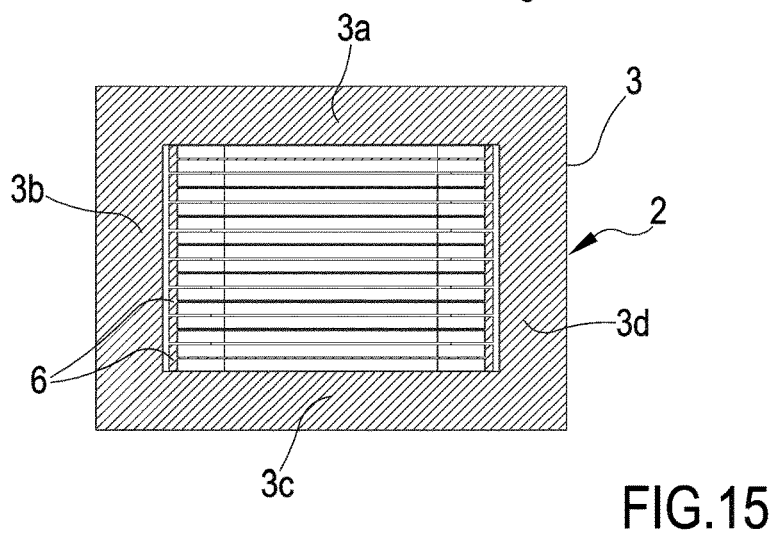

RATIONAL HIVE STRUCTURE

TECHNICAL FIELD

The present invention relates to a hive structure, in particular an improved rational hive architecture to develop a bee colony.

The disclosed hive structure provides an improved synergy between the hive and the bee colony, resulting in better-performing bees compared to those living in standard hives, including the quality of each bee, the colony as a whole, and an improved resistance to parasites and bee pathologies.

BACKGROUND

Honeybees are social insects living in wax nests dedicated to the production and storage of honey and pollen. Western honeybee is the best-known honeybee, which has been used for honey production and crop pollination, according to its biological life cycle. The honeybee managed by humans faces the increasing difficulties due to the worldwide increase of honeybee mortality.

Honeybee colonies instinctively choose natural nests to live in and reproduce; a natural nest structure is generally a cavity where the honeybees adapt building wax combs. Hives are human-made artificial nests used for beekeeping purposes. Hives can be subdivided into natural ones, e.g. skeps or hollow trees, and into rational hives. Colonies settled in natural nests are generally low populated and rear less brood with respect to the ones in rational hives (Honeybee Nests: Composition, Structure, Function—H. R. Hepburn, C. W. W. Pirk, O. Duangphakdee). Rational hives are modular and they provide a space (the nest) where the bees rear new generations and a space (the super) where the bees store honey.

In most cases, rational hives make use of removable frames to sustain the combs. When the super uses the same nest frame/comb assigned to the nest the architecture of the rational hive is horizontal; in this case, the super is placed at a lateral side with respect to the nest. Vertical hives, on the other hand, utilize a modular layered structure extending vertically. The bee-space concept allows a nest inspection without damaging the colony; however, natural combs or top bars can be used as well.

Rational hives are used worldwide due to their suitability to certain beekeeping operations that provide advantages over natural hives or natural nests. Some advantages include large-scale use, inspection, artificial replication, transportability, mono-flora honey extraction, superior pollination capability and major colony population and control of parasite and bee pathologies by the beekeeper.

Several hive types exist, and their use depends on the location, culture and availability of materials for construction. Each type of hive is geometrically different, being designed e.g. to allow truck transportation and/or to allow monoflora honey production. Rational hives are built in geometrical similitude (in terms of volume, comb surface, etc.) with natural nests (e.g. Lazutin/Layens hives) and they provide the space the colony requires during its seasonal development.

A Langstroth hive type is used in any climatic location, from India to Alaska, including Australia, America, and Europe. The colony population and the brood surface is seasonal and strongly conditioned by climatic temperature. The colony productivity and the flying bees vary non-proportionally with the population size so that colonies with high populations are in high demand for agriculture services.

Strong bee populations can be effective in preventing several colony diseases, such as small beetle, *Vespa velutina*, fungus, etc. In recent years, the cost of managing a strong bee colony barely makes commercial pollination services profitable.

Maintaining a strong colony depends on environmental conditions and the bee strain. An important hive characteristic is the total (wax) surface of the brood chamber. A strong colony reaches a maximal brood surface between 40 and 180 $dm^2$ during the season, which the brood then transforms into a standard rational hive. Colonies in natural nests present on average one-half of the brood surface with respect to colonies managed in rational hives. From Europe to Africa, the maximal Dadant/Langstroth brood surface is lower than 200 $dm^2$. This is generally an over estimation of the maximal brood surface considering the high colony sensitivity to pathologies.

The total nest surface is not subject to sensible variations even if more frames (wax combs or free space in case of natural combs) are provided to the colony into the hive, or by modifying the nest configuration from horizontal to vertical. The total brood surface is perceived as a colony expression and not as a hive-induced characteristic. The honeybee colony population is slightly affected by the hive type, but it is highly affected by diseases.

A colony needs to produce and regulate heat in order to survive and reproduce. Honeybees can rear brood in a wide range of temperatures between 26-36° C. To thermo-regulate the nest, bees burn honey or sugar provided by the beekeeper. The whole nest is generally thermo-regulated by bees. In most cases, bees cover the total brood surface in order to warm it. The temperature of the hive brood chamber affects the queen egg-laying ratio. The nest incubation temperature strongly influences the newborn bee mortality, activity, communication, and flight capability. Due to the bee temperature dependency, some potential improvements for a better-insulated hive are known.

The thickness and the composition of the nest walls will act as insulation and buffer for the internal environment of the nest. To illustrate, a top bar hive in Scotland will probably benefit from some kind of winter insulation more than, for example, a double walled WBC in the South of England. In addition, it is important to note that insulating the hive may affect the humidity. Bee temperature dependency is well known to have biological effects (e.g. queen laying ratio and incubation timing). However, the relationship between the hive performance and colony development is often overlooked. Some improvements were randomly observed providing more insulation above existing hive types, but some strong disadvantages emerged (such as humidity issues). As of today, a specific relation between the existing hive types and the colony development is not thought to exist. Furthermore, it is believed that no one has attempted to engineer a hive for maximizing the efficiency of the hive toward colony development, highlighting a quantum benefit due to the hive concept.

It is believed that no significant solutions are available that recognize the advantages of an optimized hive shape. It is remarked that the nest temperature control relies on bees only. The knowledge of honeybee and its parasites population dynamic is based on the study of the final effects in terms of gross values of infestation or population size or measuring the growing ratio parameters, or the relations of those resulting parameters to the bee life span. It is important to outline how the rough growing ratio coefficients have been widely measured without however understanding or at least investigating their relations to the hive structure. The entire observations were produced with the use of rational hives only.

The colony is measured in gross population and brood surface to evaluate its work capability and to define pollination fees. Inspection of the hive is required, even by law in some cases. Honeybee colony population remains unaffected by the hive, by the frame (or comb) size; by the intermediate spaces between the combs as they do not constitute any obstacle for the bees and the queen.: "Bees can adapt to any type and size of hive and of honeycomb. These characteristics do not have a significant impact on the development of the colony. When selecting hives, particular attention must therefore be paid to the type of management of the apiary, the technical aspects of the activity, the harvesting conditions and the measures to control Varroa.

The basic regulation mechanism responsible, during the beekeeping season, of the impressive growth and the related decrease of the population as well as of the transition from summer bees to winter bees, is genetically established and physiologically regulated.

The choice of the type of hive or the size of the honeycombs is also irrelevant for the development of the colony." (Agroscope Liebefeld-Posieux ALP (Imdorf A., Ruoff K., Fluri P., Development of the honeybee colonies, ALP forum N. 68 November 2011), Swiss honeybee research center and Liebig (Liebig, G.; Gerlich, R.; Sanzenbacher, R. (1997) The development of bee colonies on different sized honeycombs, D. Bienen J. 5 (1): 18-19.)

The effect of the standard rational frame size miniaturization leads to weak colony development. The beekeeper experience worldwide confirms lack of hive-colony dependency. Proper insulation applied to standard hives leads to insignificant advantages compared to the enormous influence of pathologies. Consequently, insulation is not a cost effective solution for professional beekeepers. Insulation does not solve the survival problems encountered in cold climates (e.g. Alaska). Furthermore, the attempt to enhance hive insulation and the use of standard hives in very humid climates lead to strong negative effects due to inner condensation/humidity, which increases the colony mortality or causes other pathologies.

The honey to brood equivalence is the ratio between the capped wax stores (honey) which a colony requires to build and develop unitary surface of brood. The honey to brood equivalence measures the gross energetic cost of the new generation rearing. Several experiments were performed to measure the honey to brood equivalence; in almost all the cases a 1:1 relationship was found. This means that for carrying a full development of 1 $dm^2$ of eggs to bees, the colony requires 1 $dm^2$ of capped stores. For standard hives, the honey to brood equivalence may be also expressed as (0.3 kg stores)/($dm^2$ brood).

The honey-to-brood equivalence is considered a biological characteristic of the honeybee species. Pathologies and parasites are not substantially influenced by the hive type. Varroa mite is one of the most dangerous parasites for the honeybee. Varroa has spread in all world hives since the late 1980s, with the exception of Australia. Varroa mite development cannot be naturally stopped in western honeybee strains. In the absence of a beekeeper's care, a bee colony can collapse in a few months to one year.

The population dynamic of Varroa mite parasite may be characterized by the growing ratio. Climatic conditions influence pest diffusion, but again the hive influence is excluded. Wax cell size doesn't affect Varroa mite development. Depending on the location and climate, the Varroa mite can develop with significant yearly variations; the Varroa mite development strongly depends to the bee strain: resistant bees include Africanized, Cerana, Russian, Monticola, and others. Varroa mite infestation can be experimentally measured in the colony. The danger of Varroa mite infestation has been reduced by a factor of four in the last 10 years. Also, a small infestation damages the colony because of the continuous virus inoculation.

Varroa mite has a relevant impact in colony loss. It is recognized worldwide that a colony cannot survive more than one year without chemical treatment against Varroa mite. On average one to four treatments per year are required. Additionally, a standard colony cannot survive with standard formic treatment only. Given the above, Varroa infestation strongly affects the beekeeper economy.

A critical factor is the environmental high influence on the Varroa treatment efficacy. This last factor is a strong limit to the application of formic acid treatment. Formic acid is cost effective and bees do not develop resistance. Amitraz and fluvalinate are the most effective chemical mite killers, but their efficacy cannot be improved. Alternative solutions are highly expected. As explained, chemical methods are used by all beekeepers to contrast pests. Some beekeepers use selective methods to duplicate the bees' natural resistance to pests. Beekeepers, scientists and agriculture organizations dedicate special efforts to this activity without however reaching significant or replicable results. The selection of resistant bees is highly time consuming and costly. Years or decades are required, and no success is guaranteed; the examples of success cannot be replicated in different geographic areas. Very few success stories regarding the selection of mite resistant bees are worldwide acknowledged. Moreover, the reasons for success are often unclear, and furthermore, success stories were obtained in countries where feral colonies were present and huge distances between apiaries existed. The method to select resistant bees includes the human made selection of bee colonies able to exhibit some resistant mechanism against Varroa mite, e.g. grooming, hygienic, or a selection starting from few survived bees coming from a large number of colonies.

SUMMARY

The invention regards an optimized hive structure and an optimized hive frame/comb. A measuring device and method to certify the advantages that the bee colony and the beekeeper can consequently receive from the invention is also described. An aim of the present invention is to provide an enhanced rational hive capable of improving the bee colony population dynamics. Other aims of the described embodiments include at least one of the following:

increase colony population;
increase of the brood surface respect standard colonies with identical population and location;
decrease of pathologies;
increase possibility to produce artificial swarms;
colony loss reduction;
self re-queening reduction;
modification of the ratio between bees into the nest and flying bees at favor of the flying bees;
increase of the surplus and pollination capability;
increase of the flight activity;
reduction in Varroa mite growing ratio;
increased colony strength;
reduction of artificial nutrition;
increased colony strength to extreme climates;

easier and effective genetic selection/breed rearing resistant bees;

worldwide reproducibility of the invention independently form the climate.

The embodiments of the invention lead to quantum benefits for the colony and the beekeeper with respect to standard hives. The resulting bee quality, the colony development and population, as well as its short and long-term resistance to pathologies and parasites, increase significantly. Colony loss reduction is also obtained. The optimized hives can be used with natural combs or with removable frames. In the latter case, the invention allows rational beekeeping operations with highly cost effective and bee oriented solutions. Aspects of the invention are here-below reported.

In a 1st independent aspect, a rational hive structure (1) is provided comprising:
- a nest comb box (2) delimiting a brood chamber for bees, the nest comb box including a lateral wall (3) delimiting an inner cavity housing the brood chamber;
- a top cover (4) located in an upper portion of the hive structure to close an upper access to the hive structure;
- a lower closure element (5) located in a lower portion of the hive structure to close a bottom access to the hive structure;
- a plurality of comb frames (6) in the form of substantially flat bodies extending in a main plane, each comb frame including peripheral element or bars (7) delimiting an inner comb area (8), wherein the inner comb area (8) has a one-side overall dimension of at least 15 dm2.

In a 2nd independent aspect, a rational hive structure (1) is provided comprising:
- a nest comb box (2) delimiting a brood chamber for bees, the nest comb box including a lateral wall (3) delimiting an inner cavity housing the brood chamber;
- a top cover (4) located in an upper portion of the hive structure to close an upper access to the hive structure;
- a lower closure element (5) located in a lower portion of the hive structure to close a bottom access to the hive structure;
- optionally a plurality of comb frames (6) in the form of substantially flat bodies extending in a main plane, each comb frame including peripheral element or bars (7) delimiting an inner comb area (8), wherein the rational hive structure presents a hive thermal dissipation parameter less than 0.00600 [W/(dm2·° C.)], measured at a predetermined ΔT of imposed temperature difference.

The hive thermal dissipation parameter is measured according to the measurement instrument and protocol as described in the specific paragraph of description having the title "Measurement instrument and protocol".

In a 3rd aspect according to any of the preceding aspects, the rational hive structure presents a hive thermal dissipation parameter less than 0.00600 [W/(dm2·° C.)], in particular a hive thermal dissipation parameter less than 0.005 [W/(dm2·° C.)], measured at predetermined ΔT, in particular at 26° C. of imposed temperature difference.

In a 4th aspect according to any of the preceding aspects, the comb frame (6) has a polygonal structure, in particular a rectangular structure or a trapezoidal structure.

In a 5th aspect according to any of the preceding aspects, the comb frame (6) is symmetric with respect to a vertical axis.

In a 6th aspect according to any of the preceding aspects, the comb frame (6) includes four bars (7) connected to each other to define the comb frame, an upper bar (7a) being connected to a lower bar (7b) with the interposition of two respective lateral bars (7c, 7d), said comb frame (6) being removably housed into the nest comb box (2).

In a 7th aspect according to the preceding aspect, the upper and the lower bars (7a, 7b) are substantially parallel to each other.

In an 8th aspect according to the preceding two aspects, the upper bar (7a) is longer than the lower bar (7b).

In a 9th aspect according to the preceding three aspects, lateral bars (7c, 7d) have a substantially equivalent length.

In a 10th aspect according to the preceding four aspects, at least one of the lateral bars (7c, 7d) is inclined with respect to the upper and lower bars (7a, 7b) to define an obtuse angle with respect to the lower bar (7b), optionally both lateral bars (7c, 7d) being inclined to define respective obtuse lower angles.

In an 11th aspect according to the preceding five aspects, the upper bar (7a) is configured to be received and to be supported by an upper side of the comb frame lateral wall (3).

In a 12th aspect according to any of the preceding aspects, the comb frame (6) comprises a comb foundation sheet within the bars (7).

In a 13th aspect according to any of the preceding aspects, the bars (7) delimit the outer perimeter of the comb frame (6).

In a 14th aspect according to any of the preceding aspects, in use condition, the plurality of comb frames (6) vertically lays in side by side relationship, a distance between a middle vertical plane of one comb frame and a middle vertical plane of an adjacent comb frame (6) being substantially constant and included between 28 and 35 mm.

In a 15th aspect according to any of the preceding aspects, in use condition, the plurality of comb frames (6) vertically lays in side by side relationship, a distance between a middle vertical plane of one comb frame and the lateral wall (3) of the nest comb box being substantially constant and included between 14 and 18 mm.

In a 16th aspect according to any of the preceding aspects, in use condition, the comb frame (6) has a geometric barycenter placed in an upper position with respect to half of the comb frame height.

In a 17th aspect according to any of the preceding aspects, in use condition, a line along the middle height divides the inner comb area (8) into an upper area (8a) and a lower area (8b), a ratio between the upper area (8a) and the lower area (8b) of the inner comb area (8) being at least 1.05 and optionally at least 1.12 or greater.

In a 18th aspect according to any of the preceding aspects, the comb frame (6) is trapezoidal with an upper base longer than a lower base and an angle frame of at least 1° and optionally of at least 3° or greater (see e.g., FIG. 9A).

In a 19th aspect according to any of the preceding aspects, in use condition, the comb frame (6) has an overall horizontal dimension lower than a vertical overall dimension.

In a 20th aspect according to any of the preceding aspects, in use condition, the comb frame (6) is higher than larger.

In a 21st aspect according to any of the preceding aspects, in use condition, the comb frame (6) has a height longer than a base, in particular the height of the comb frame being at least 1.5 times the base and in more detail being twice the base.

In a 22nd aspect according to any of the preceding aspects, the overall dimension of the inner comb area (8) of each comb frame (6) is comprised between 12 and 50 dm2, in particular the overall dimension being between 15 and 28 dm2, in particular around 20 dm2.

In a 23rd aspect according to any of the preceding aspects, the overall dimension of the inner comb area (8) of all the comb frames (6) is higher than 100 dm2.

In a 24th aspect according to any of the preceding aspects, the overall dimension of the inner comb area (8) of all the comb frames (6) is comprised between 150 and 350 dm2, in particular the overall dimension of the inner comb area (8) of all the comb frames (6) is comprised between 200 and 300 dm2.

In a 25th aspect according to any of the preceding aspects, the hive includes at least two comb frames and optionally at least four comb frames (6).

In a 26th aspect according to any of the preceding aspects, the hive includes between two and fifteen comb frames.

In a 27th aspect according to any of the preceding aspects, the comb frames (6) are housed into the nest comb box (2) parallel one with the other, having respective inner comb areas (8) facing one another.

In a 28th aspect according to any of the preceding aspects, the comb frames (6) are housed into the nest comb box (2) and lay vertically when in use.

In a 29th aspect according to any of the preceding aspects, the lateral wall (3) has a minimum thickness of about 20 mm, particularly higher than 30 mm.

In a 30th aspect according to any of the preceding aspects, the lateral wall (3) has a thermal conductivity lower than 0.5 W/(m·K), in particular lower than 0.3 W/(m·K).

In a 31st aspect according to any of the preceding aspects, the lateral wall (3) has a heat transfer coefficient lower than 5 W/(m2·K), in particular less than 3.5 W/(m2·K).

In a 32nd aspect according to any of the preceding aspects, the lateral wall (3) is made of wood and/or polyurethane and/or expanded polymers.

In a 33rd aspect according to any of the preceding aspects, the lateral wall (3) delimiting the inner cavity housing the brood chamber includes four lateral panels (3a, 3b, 3c, 3d) delimiting a substantially parallelepiped inner cavity.

In a 34th aspect according to the preceding aspect, a distance between a lateral bar (7c; 7d) of said bars (7) of the comb frame (6) and a lateral panel (3a; 3b; 3c; 3d) is substantially constant and included between 8 and 12 mm.

In a 35th aspect according to any of the preceding aspects, the comb frames (6) lay parallel to two opposite flat lateral panels (3a, 3b, 3c, 3d) of the lateral wall (3) delimiting a parallelepiped inner cavity.

In a 36th aspect according to any of the preceding aspects, the lateral wall (3) delimiting the inner cavity housing the brood chamber includes four flat lateral panels (3a, 3b, 3c, 3d) delimiting a parallelepiped inner cavity, opposite lateral panels being parallel one to the other.

In a 37th aspect according to any of the preceding aspects, the lateral wall (3) delimiting the inner cavity housing the brood chamber includes four lateral panels (3a, 3b, 3c, 3d) delimiting a substantially parallelepiped inner cavity, two opposite lateral panels being parallel one another, the other two lateral panels having a thickness increasing on moving from an upper portion of the lateral wall (3) towards the lower portion of the lateral wall (3).

In a 38th aspect according to any of the preceding aspects, the lateral wall (3) has no holes or cavities for putting into fluid communication the external environment with the inner cavity housing the brood chamber, e.g. neither entrance for the bees nor vent is provided in the lateral wall (3).

In a 39th aspect according to any of the preceding aspects, the lateral wall (3) is of tubular configuration having an upper passage and a lower passage.

In a 40th aspect according to the preceding aspect, the top cover (4) directly closes the upper passage, in particular no holes or cavities for putting into fluid communication the external environment with the inner cavity housing the brood chamber are present in the top cover (4) and/or between the top cover and the lateral wall (3).

In a 41st aspect according to the preceding aspect 37, the hive further includes at least one honey super (9) placed in correspondence of the upper passage of the nest comb box (2).

In a 42nd aspect according to the preceding aspect, the honey super (9) comprises a box (10) and a plurality of frames for honey (11), said frames for honey being hung in the box.

In a 43rd aspect according to the preceding aspect, the box (10) has no holes or cavities for putting into fluid communication the external environment with an inner cavity of the box.

In a 44th aspect according to the preceding two aspects, the top cover (4) directly closes an upper part of the box (10), in particular no holes or cavities for putting into fluid communication the external environment with the inner cavity housing the brood chamber are present in the top cover (4) and/or between the top cover and the box (10).

In a 45th aspect according to any of the preceding aspects, the top cover (4) has an overall thickness of at least 10 mm, in particular of at least 20 mm and more in particular of at least 40 mm.

In a 46th aspect according to any of the preceding aspects, the top cover (4) is box shaped including a closed air chamber (15) confined between top and bottom panels (4a, 4b) and lateral wall panels (4c).

In a 47th aspect according to any of the preceding aspects, the hive further comprises a bottom case (12) placed below the nest comb box (2), in particular the nest comb box and the bottom case being separate and distinct elements.

In a 48th aspect according to the preceding aspect, the bottom case (12) comprises an auxiliary lateral wall (13) delimiting a bottom cavity, in use condition, the comb frames (6) being preferably not housed in the bottom cavity.

In a 49th aspect according to the preceding aspect, the bottom case (12) comprises a bee entrance (14), said bee entrance (14) being at a distance (D), in particular a vertical distance, from the comb frames (6) of at least 15 mm.

In a 50th aspect according to the preceding aspect, said distance (D) is less than 200 mm and particularly the distance is at least between 100 and 120 mm.

In a 51st aspect according to the preceding two aspects, the distance (D) is a vertical distance between the entrance (14) and a lower bar (7d) of the comb frames (6).

In a 52nd aspect according to the preceding three aspects, the bee entrance (14) is in the form of an elongated horizontal slot, in particular a height of the slot being between 8 and 16 mm and particularly about 12 mm.

In a 53rd aspect according to the preceding four aspects, the comb frames extend away from the bee entrance.

In a 54th aspect according to the preceding six aspects, the auxiliary lateral wall (3) is of tubular configuration having an upper passage and a lower passage, the upper passage putting into fluid communication the bottom case (12) with the nest comb box (2).

In a 55th aspect according to the preceding aspect, the lower closure element (5) closes the lower passage of the auxiliary lateral wall (3).

In a 56th independent aspect a method of increasing the bee population and reduce parasites in a rational hive structure is provided, comprising providing a rational hive structure, in particular according to anyone of the previous aspects, comprising a nest comb box (2) delimiting a brood chamber for bees, the nest comb box including a lateral wall (3) delimiting an inner cavity housing the brood chamber; a top cover (4) located in an upper portion of the hive structure to close an upper access to the hive structure; a lower closure element (5) located in a lower portion of the hive structure to close a bottom access to the hive structure; a plurality of comb frames (6) in the form of substantially flat bodies extending in a main plane, in particular the comb frames having an area of at least 150 dm2, the comb frames defining the brood area; the method including the step of maintaining a temperature in at least 50% of the brood area over 30° C. when the bees are living in the rational hive structure during normal use of the rational hive structure and when the external temperature is equal or below to 5° C.

In a 57th aspect according to the preceding aspect, no active heating means, such as electric heater, are used inside the rational hive structure to heat the brood area, in particular the brood area being heated by the bees only.

In a 58th aspect according to any of the preceding method aspects, the method includes the step of maintaining a temperature in at least 20% of the brood area over 32° C. when the bees are living in the rational hive structure during normal use of the rational hive structure and when the external temperature is equal or below to 10° C., in particular maintaining a temperature in at least 50% of the brood area over 32° C.

In a 59th aspect according to any of the preceding method aspects, the method includes the step of maintaining a temperature in at least 50% of the brood area over 34° C. when the bees are living in the rational hive structure during normal use of the rational hive structure and when the external temperature is equal or below to 10° C.

In a 60th aspect according to any of the preceding method aspects, the method includes positioning the hive structures in proximity of plants to be pollinated in order to implement a method of pollinating.

In a 61st aspect according to any of the preceding method aspects, the method comprising a step of making the bees flying out of the rational hive structure at an external temperature below 12.8° C.

In a 62nd aspect according to any of the preceding method aspects, a honey area to brood area equivalence (i.e. dm2 capped store to dm2 of brood) is less than 0.9, particularly less than 0.8 and about (or less than) 0.5.

In a 63rd independent aspect a method of pollinating is provided including providing a plurality of rational hive structures according to anyone of the previous hive aspects; positioning the hive structures in proximity of the plants to be pollinated.

BRIEF DESCRIPTION OF THE DRAWINGS

Preferred, non-limiting embodiments of the present invention will be described hereinafter with specific reference to the following non-limiting figures, wherein:

FIG. 1A shows an exploded perspective view of a rational hive in accordance with the prior art (Langstroth);

FIG. 1B shows the brood temperature versus the brood surface in a rational hive according to prior art;

FIG. 1 shows a cross-sectional view of the hive in accordance with an embodiment of the invention taken along a first vertical plane;

FIG. 2 shows a cross-sectional view of the hive of FIG. 1 taken along a second vertical plane orthogonal to the first plane (line II-II);

FIG. 13 shows a cross-sectional view of the hive in accordance with another embodiment of the invention taken along a first vertical plane;

FIG. 14 shows a cross-sectional view of the hive of FIG. 13 taken along a second vertical plane orthogonal to the first plane (line XIV-XIV);

FIG. 15 shows a cross-sectional view of the hive of FIG. 13 taken along an horizontal plane (line XV-XV);

DETAILED DESCRIPTION

Figure 3:
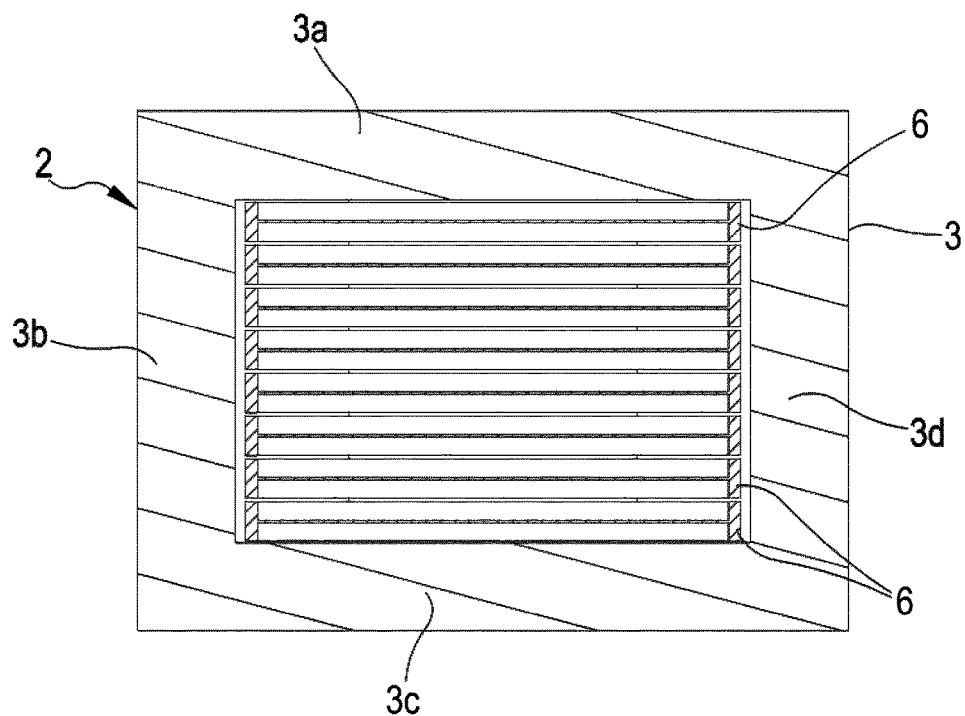
FIG. 3 shows a cross-sectional view of the hive of FIG. 1 taken along an horizontal plane (line III-III)

A rational hive structure in accordance with embodiments of the present invention is indicated with reference number 1. In the various embodiments, same reference numbers refer to the same element. The rational hive structure 1 comprises a nest comb box 2 delimiting a brood chamber for bees. In modern hives, the brood chamber is the nursery area where brood at various stages of development—eggs, larvae, and pupae—is located. The nest comb box is generally in the shape of a box defining at its interior the brood chamber.

From a structural point of view, the nest comb box 2 includes a lateral wall 3 delimiting the inner cavity housing the brood chamber. The inner cavity has a cross-section in a horizontal plane (see e.g. FIGS. 3, 6, 9, 12, 15 and 18) of polygonal shape, particularly rectangular; the dimension and rectangular elongation are defined by the number and dimensions of the removable comb frames 6 housed therein (below described in detail).

In other embodiments, the inner cavity may have a circular or elliptical cross-section in the horizontal plane. In this respect, the lateral wall 3 delimiting the inner cavity housing the brood chamber includes four lateral panels 3a, 3b, 3c, 3d delimiting a substantially parallelepiped inner cavity. To obtain a reasonable insulation, the lateral wall 3 has a minimum thickness of about 20 mm, but particularly higher than 30 mm. To the same purpose, the thermal conductivity of the same lateral wall should be low, e.g. lower than 0.3 W/(m·K).

The nest comb box 2 is made therefore of an insulating material, particularly having a low conductivity, such as wood or polyurethane or expanded polymer. In this respect, taking into consideration both the thickness and the thermal conductivity (the higher the thickness, the lower the thermal transmittance), another relevant parameter is the total heat transfer coefficient, which should be lower than 5 W/(m²·K), in particular lower than 3.5 W/(m²·K) and in even more detail less than 0.5 W/(m²·K).

To achieve the desired heat transfer coefficient and to control radiation heat exchange, films, layers, painting or other materials can be used to cover and/or paint the inner or external nest. Moreover, to achieve the desired heat transfer, inner natural convection can be improved.

In other terms, in the described embodiments, design choices were made to reduce the heat transfer coefficient by working on heat conductivity, radiation and/or natural convection (in particular improving the design in respect to all the above technical features). As shown in the various embodiments, the final shape of the nest comb box 2 might be different.

FIG. 1 shows a nest comb box 2 developing vertically: in the upper portion the comb frames 6 are housed; the lower portion is substantially a hollow space. The wall thickness is constant in correspondence of the upper portion and increases inside the inner cavity from a maximum overall dimension at the lower end of the comb frames 6 tapering towards a bottom of the hive up to reaching a minimum overall dimension, which remain constant up to the box lower passage.

Figures 4, 5:
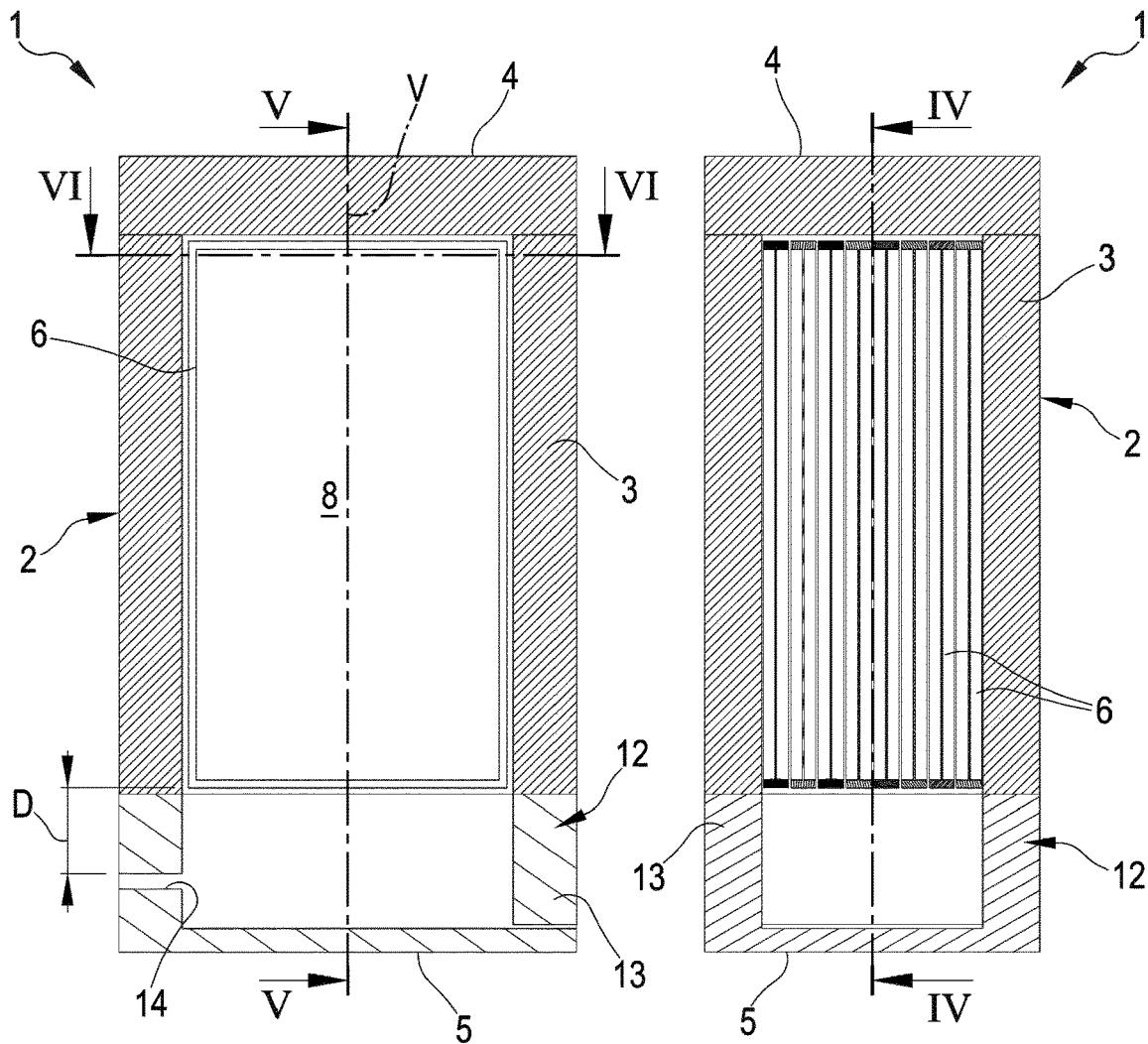
FIG. 4 shows a cross-sectional view of the hive in accordance with another embodiment of the invention taken along a first vertical plane.
FIG. 5 shows a cross-sectional view of the hive of FIG. 4 taken along a second vertical plane orthogonal to the first plane (line V-V)

Differently, FIG. 4 shows a nest comb box 2 having the lower passage aligned with the lower end of the comb frames 6. The box 2 according to FIG. 4 includes four flat lateral panels 3a, 3b, 3c, 3d delimiting a parallelepiped inner cavity, and opposite lateral panels are constantly parallel one to the other.

Figure 7:
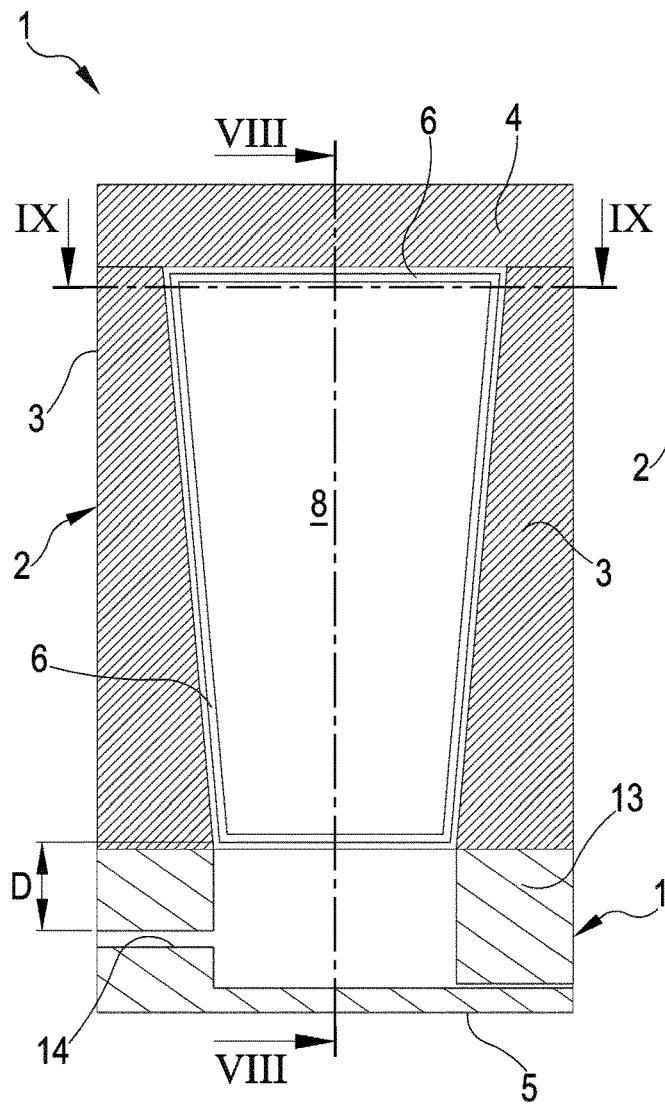
FIG. 7 shows a cross-sectional view of the hive in accordance with another embodiment of the invention taken along a first vertical plane.
Figure 8:
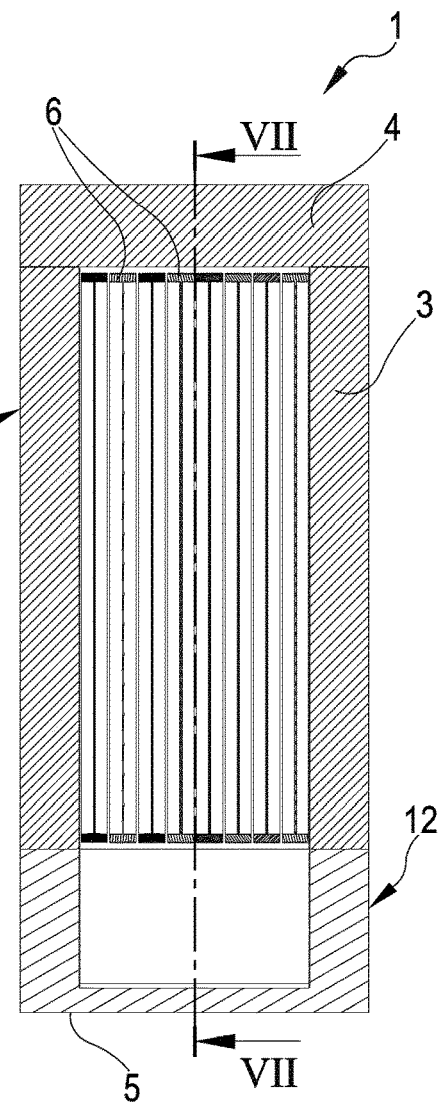
FIG. 8 shows a cross-sectional view of the hive of FIG. 7 taken along a second vertical plane orthogonal to the first plane (line VIII-VIII)

FIG. 7 (and following embodiments) shows a nest comb box 2 having (in a first cross-section view) a tapered inner configuration, particularly adapted to match (i.e. counter shaped to) the outer shape of the comb frames 6. In this latter configuration, the lateral wall 3 delimiting the inner cavity housing the brood chamber includes four lateral panels 3a, 3b, 3c, 3d delimiting a substantially parallelepiped inner cavity, in which two opposite lateral panels are parallel one another and the other two lateral panels have a thickness increasing on moving from an upper portion of the lateral wall 3 towards the lower portion of the lateral wall (3). It is noted that the lateral wall 3 has no holes or cavities for putting into fluid communication the external environment with the inner cavity housing the brood chamber, e.g. neither an entrance for the bees, nor a vent is provided in the lateral wall 3. This is in order not to affect the proper thermal insulation of the hive.

Figures 16, 17:
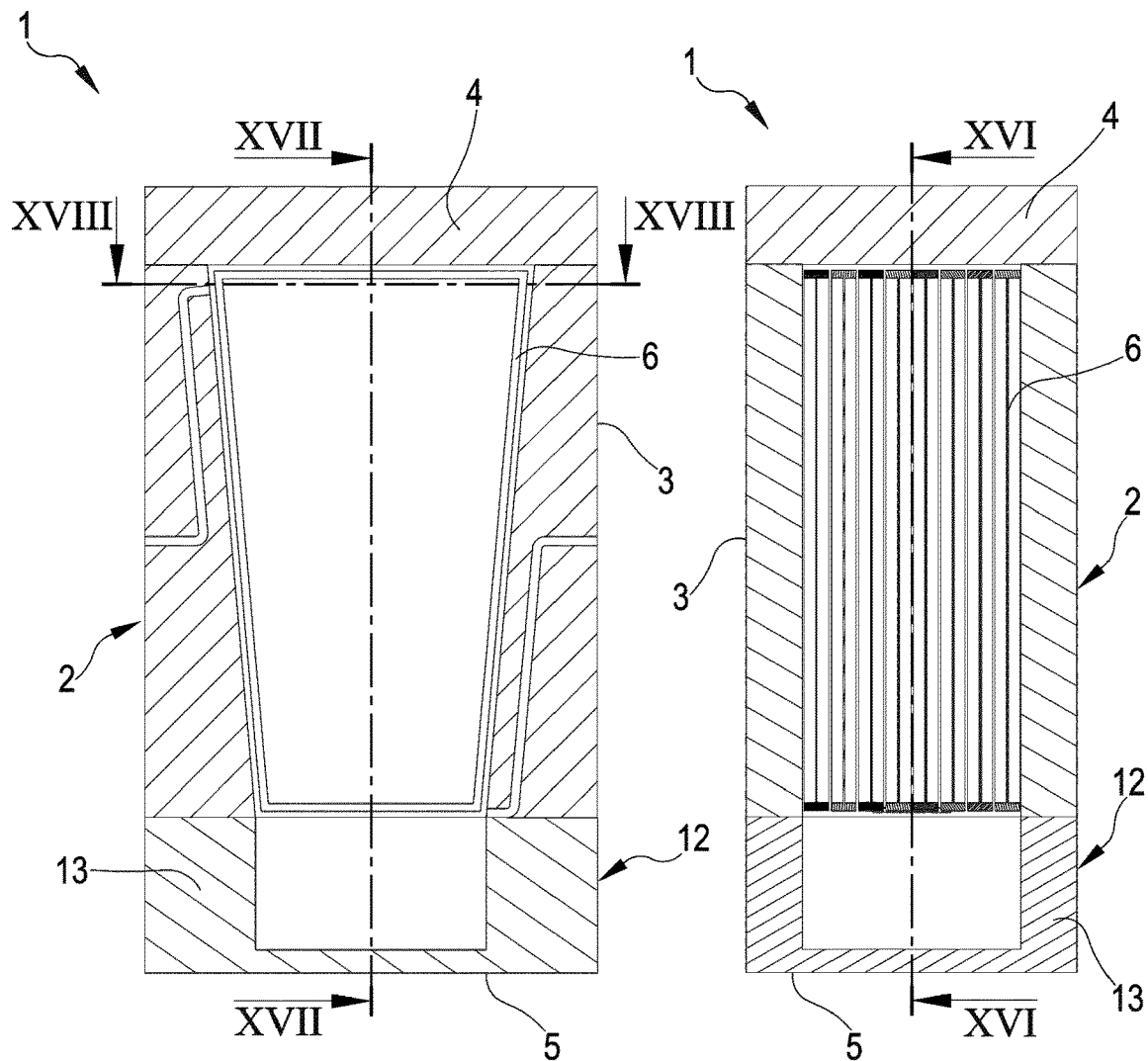
FIG. 16 shows a cross-sectional view of the hive in accordance with another embodiment of the invention taken along a first vertical plane.
FIG. 17 shows a cross-sectional view of the hive of FIG. 16 taken along a second vertical plane orthogonal to the first plane (line XVII-XVII)
Figure 18:
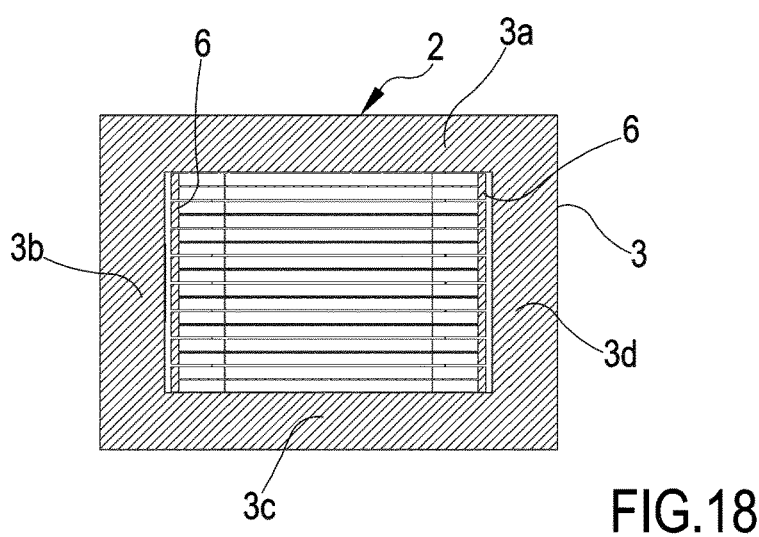
FIG. 18 shows a cross-sectional view of the hive of FIG. 16 taken along a horizontal plane (line XIII-XIII)

The exclusive exception is the hive according to FIG. 16, which is specifically designed for extremely warm condition were the external temperature is constantly higher than the requested brood chamber temperature (e.g. desert). In this specific situation, two entrances are provided in the nest comb box 2, on opposite panels 3b, 3d to allow the bees and air to enter the hive.

Figures 3A, 3B:
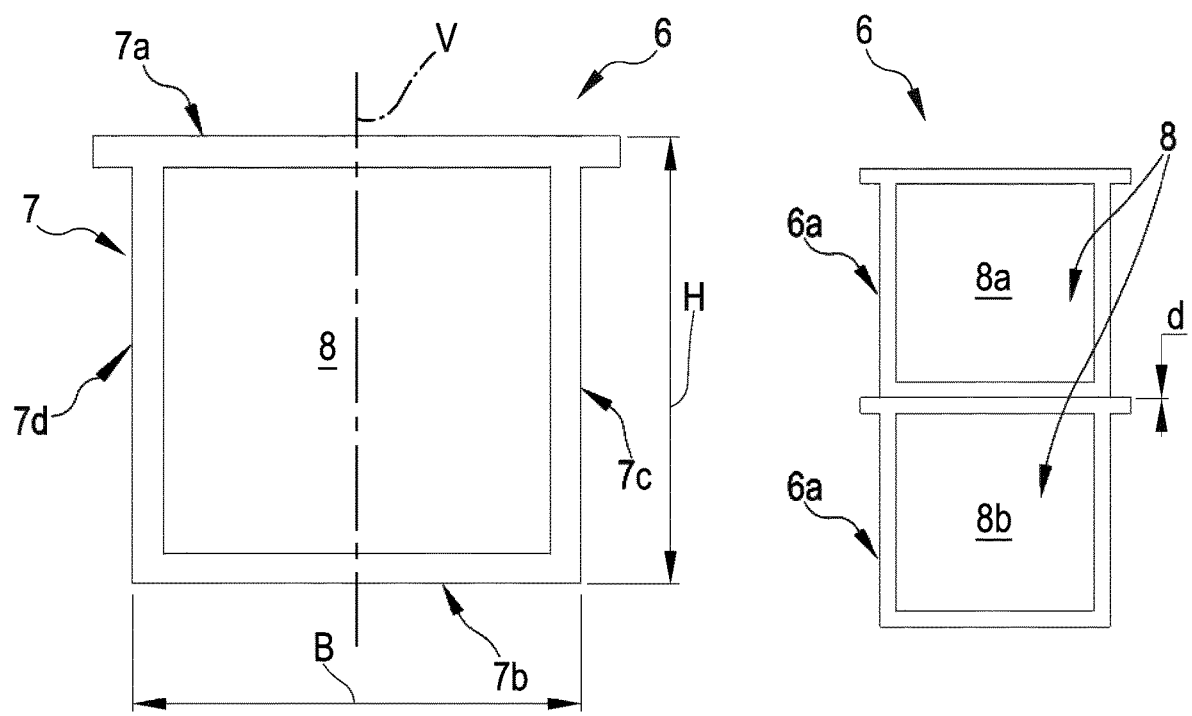
FIG. 3A shows the comb frame configuration used in the embodiment of FIG. 1 in more detail.
FIG. 3B shows a variant of the comb frame of FIG. 3A, made up of two semi-parts.
Figure 6:
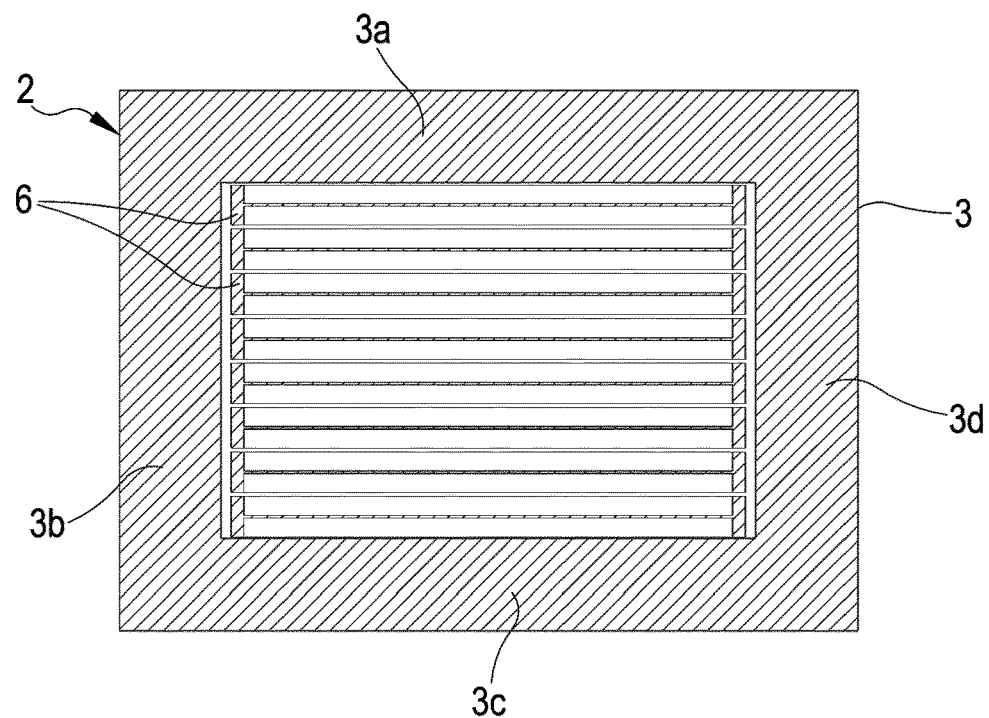
FIG. 6 shows a cross-sectional view of the hive of FIG. 5 along a horizontal plane (line VI-VI)
Figure 6A:
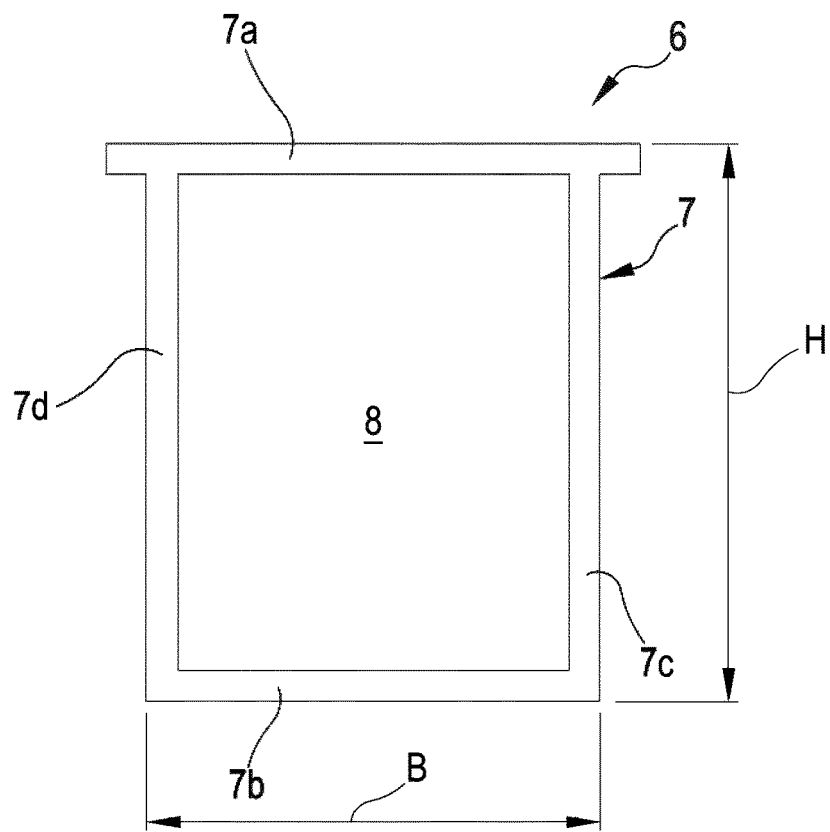
FIG. 6A shows the comb frame configuration used in the embodiment of FIG. 4 in more detail.
Figure 9:
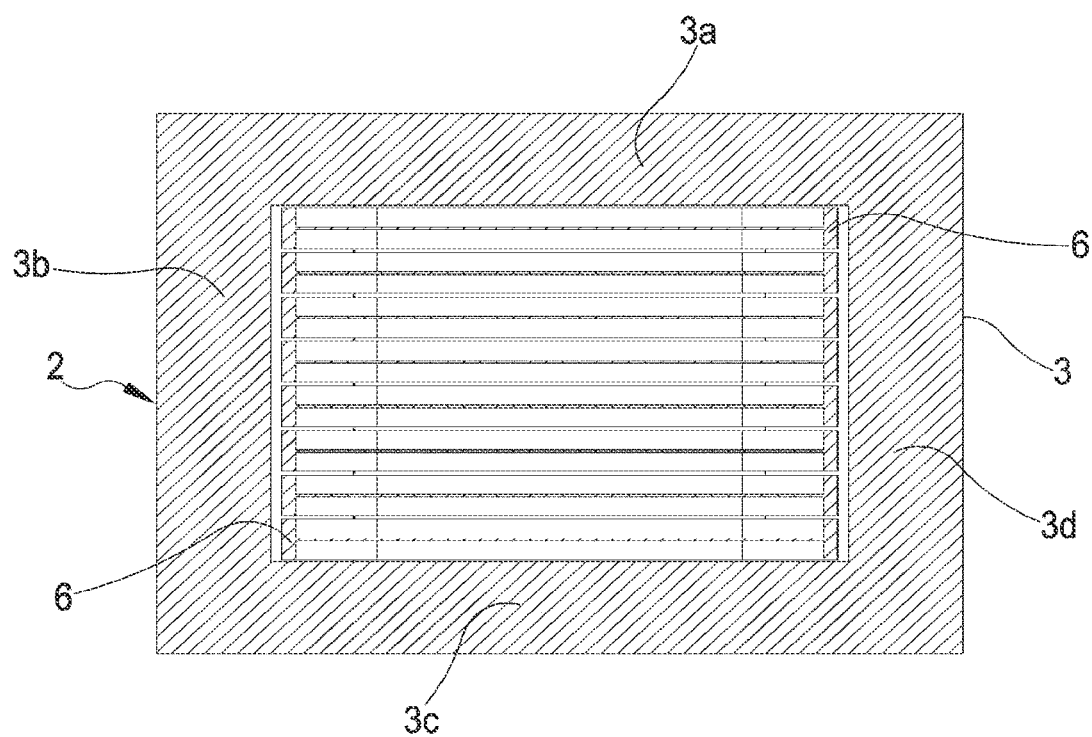
FIG. 9 a cross-sectional view of the hive of FIG. 7 taken along a horizontal plane (line IX-IX)
Figure 9A:
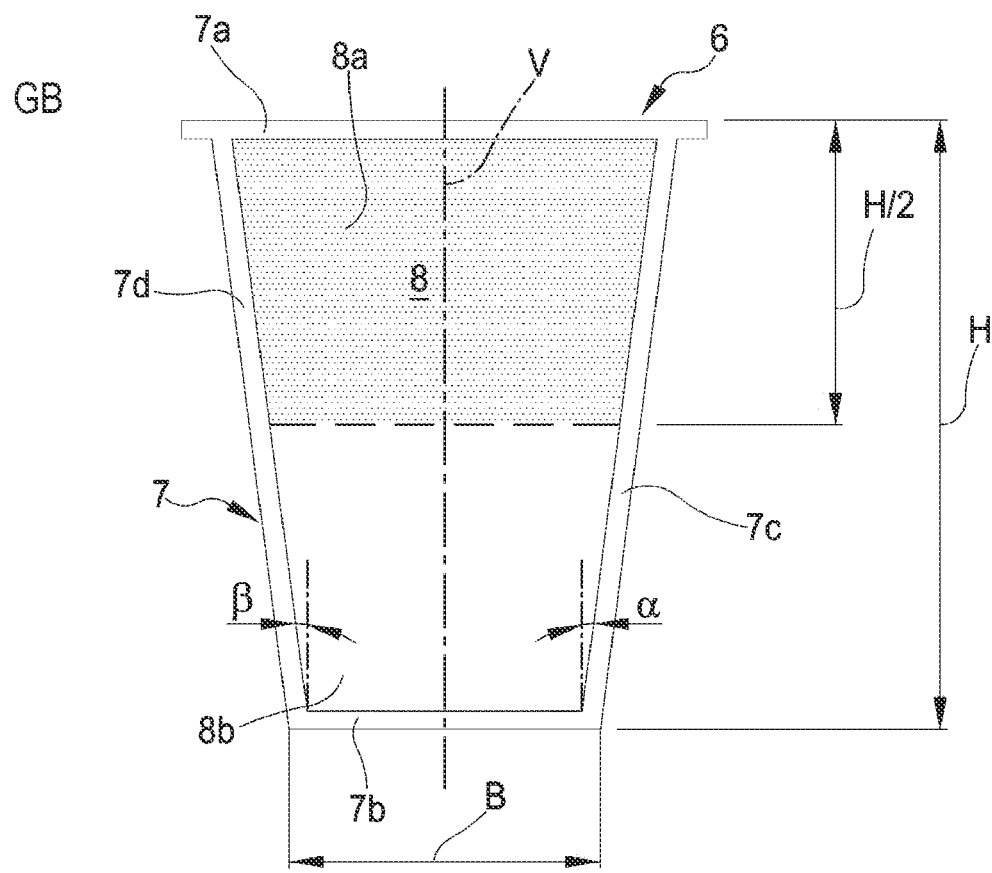
FIG. 9A shows the comb frame configuration used in the embodiment of FIG. 7 in more detail.
Figure 10:
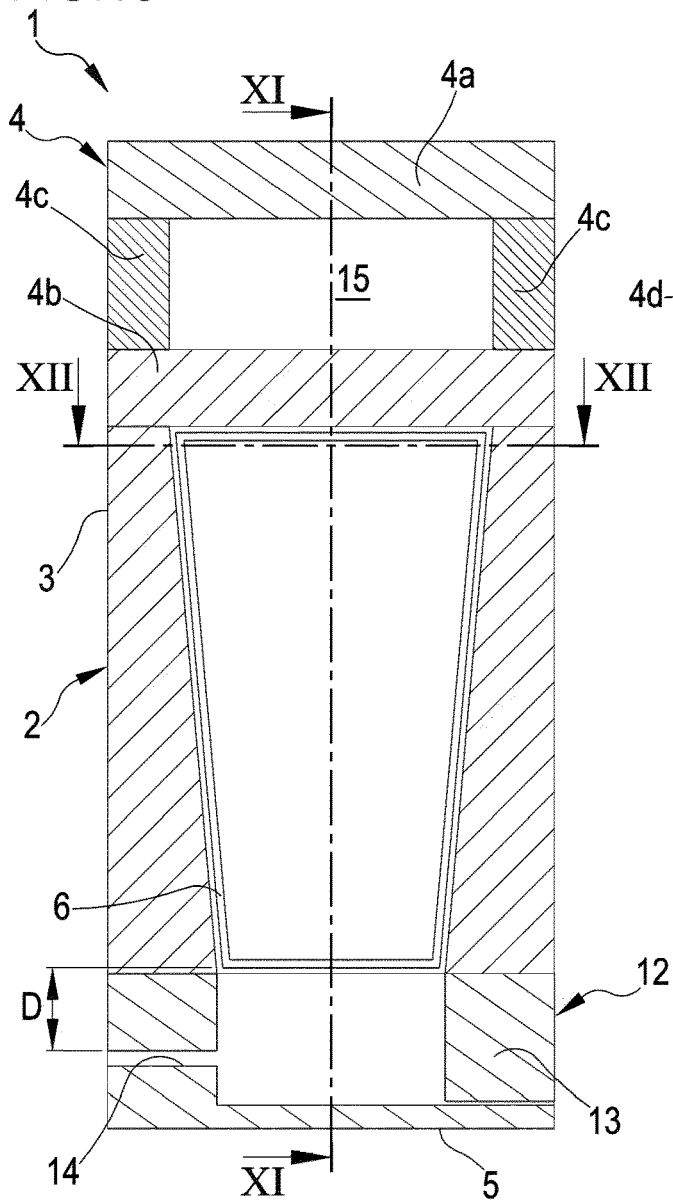
FIG. 10 shows a cross-sectional view of the hive in accordance with another embodiment of the invention taken along a first vertical plane.

The two entrances define respective tortuous passages to properly direct air into the inner chamber and forcing a ventilation direction through the comb frames; e.g. an upper inlet on one side and a lower inlet at the other side as shown. The nest comb box 2 is configured to removably house a plurality of comb frames 6, in the form of polygonal structures, such as a square structure—FIGS. 1 and 3A, a rectangular structure—FIGS. 4 and 6A—or a trapezoidal structure—FIGS. 7 and 9A, for example.

The comb frames 6 delimit and support the brood comb, which is the beeswax/plastic structure of cells where the queen bee lays eggs. It is the part of the beehive where a new brood is raised by the colony. In general, but not limiting, the comb frame 6 is in one piece, i.e. the comb frames 6 are in the form of substantially flat bodies extending in a main plane. Each comb frame includes peripheral element or bars 7 delimiting an inner comb area 8 where a comb foundation sheet is placed. Such foundation sheets allow the bees to build the comb with less effort, and the hexagonal pattern of worker-sized cell bases discourages the bees from building the larger drone cells. It is however noted that not necessarily the comb frame perimeter is completely and fully delimited by peripheral elements/bars. It may be that only one upper bar is used which support the comb foundation sheet (or alternatively one upper bar and two lateral bars emerging from the upper bar are present). Additionally (see FIG. 3*b*), it is noted that a comb frame 6 may be built up combining two semi-comb frames 6*a*, 6*b* (i.e. bringing one semi-comb frame 6*a* into close contact with the other semi-comb frame 6*b*). In this case, the semi-comb frames 6*a*, 6*b* may be fixedly joined together or not; however, a distance 'd' between the lower portion of the upper semi-comb frame 6*a* and the upper portion of the lower semi-comb frame 6*b* should be substantially zero.

In other terms, a comb frame is considered a single comb frame 6, even if made up of two one or more semi-comb frames, in case there is no gap between the bars, in particular no gap allowing the bees to pass there between. The inner comb area 8 has an overall one-side dimension of at least 12 dm$^2$ to provide sufficient space to the bee nest (correspondingly the overall inner comb area—two sides—of one single comb frame 6 should be at least 24 dm$^2$). In more detail, the inner comb area 8 of each comb frame 6 is comprised between 12 and 50 dm$^2$, preferentially between 15 and 28 dm$^2$, in particular the overall one side dimension of the relevant solutions is about 20 dm$^2$.

As mentioned, a plurality of comb frames 6 are housed in parallel in the nest comb box 2 so that the overall dimension of the inner comb area 8 sum of all the comb frames 6 is higher than 100 dm$^2$. This is considered a minimum dimension to generate a growing new bee colony. A more relevant range for the overall dimension of the inner comb area 8 of all the comb frames 6 is comprised between 150 and 350 dm$^2$; in particular the overall dimension of the inner comb area 8 of all the comb frames 6 having the best performances is comprised between 200 and 300 dm$^2$. To achieve the above areas is necessary to have more than two comb frames 6 and a reasonable range is included between 3 and 15 frames.

The comb frames 2 are housed into the nest comb box 2 parallel one with the other, having respective inner comb areas 8 facing one another. Referring to the enclosed figures, each comb frame 6 includes four bars 7 (e.g. made of wood or plastic) connected to each other to define the comb frame (the bars delimit the outer perimeter of the comb frame 6); an upper bar 7*a*, generally laying horizontally when the frame 6 is in use, is connected to a lower bar 7*b* by means of the interposition of two respective lateral bars 7*c*, 7*d*.

In certain embodiments, the comb frame may include only three bars, the upper bar 7*a* and the two lateral bars 7*c*, 7*d*. In this latter configuration no lower bar 7*b* is used. In the following description four bars are referred to, however it is intended that the same comb frame configurations are equally included with no lower bar 7*b* (i.e. the lateral bars 7*c*, 7*d* are free at their respective lower portions.

Each comb frame 6 is generally (even if not necessarily) removably housed into the nest comb box 2. The upper and the lower bars 7*a*, 7*b* may be substantially parallel to each other as shown in all embodiments. Moreover, the comb frame 6 is normally symmetric with respect to a vertical axis V.

In a first embodiment according to FIG. 1, the comb frame 6 is squared, having the four delimiting bars 7*a*-7*d* all having substantially the same extension (base B has a length equivalent to the height H). It is noted that the upper bar 7*a* may have emerging sides to be received and housed in corresponding seats of the nest comb box lateral wall so that each comb frame 6 may be (removably) supported and correctly/precisely positioned in the inner housing. In a more preferred embodiment of FIGS. 4 and 6A, the comb frame is rectangular, with height H longer than the base B; a particularly preferred ratio may include a height H being 0.8B to 3B, particularly 1.5B to 2.2B and specifically twice the base length B (2B=H). The other embodiments of FIGS. 7 to 18 includes a trapezoidal frame 6, wherein at least one of the lateral bars 7*c*, 7*d* is inclined with respect to the upper and lower bars 7*a*, 7*b* to define an acute angle α with respect to the lower bar 7*b*; optionally both lateral bars 7*c*, 7*d* are inclined to define respective acute lower angles α, β. As suggested, also just one lateral bar can be inclined. The specific example shows a comb frame having identical acute angles (i.e. α=β); this is only exemplificative and simpler to manufacture.

Figure 4A:
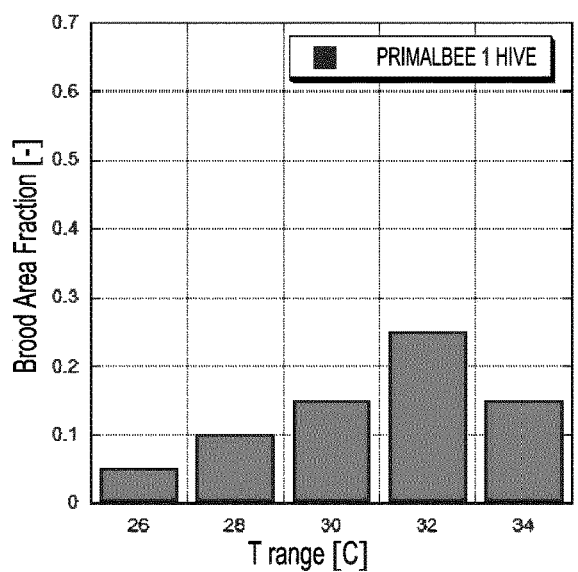
FIG. 4A shows the brood temperature versus the brood surface in a rational hive according to the embodiment of FIG. 4.

Notably, the angle α and/or β is included in a range between 1° and 15°; a good option is an angle of about 8°. The use of trapezoidal comb frames 6 allows to further increase the invention advantages because the frame barycenter is moved upward to warmer nest regions, increasing the fraction of the brood surface resident in highest brood temperature range. In this respect, FIG. 4A shows the brood temperature versus the brood surface in a rational hive according to the embodiment of FIG. 4 (rectangular frame).

As can be seen, most of the brood surface is included between 30 and 34° C., which represents an exemplificative optimum temperature range for bee development in the climate conditions were the test was run. Notably, accordingly to scientific studies (Tautz J, Maier S, Groh C, Roessler W, Brockmann A.—Behavioral performance in adult honeybees is influenced by the temperature experienced during their pupal development) even small temperature variations of 0.5° have a relevant impact in the quality and vitality of the newborn bee. On the contrary, the brood temperature versus the brood surface in a rational hive according to prior art hives has a distribution of the type shown in FIG. 1B, where most of the brood surface is about 26° C. (the lower limit for bee incubation).

Figure 7A:
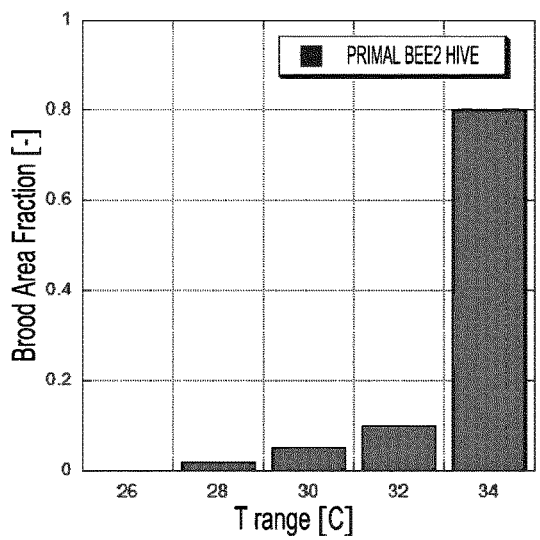
FIG. 7A shows the brood temperature versus the brood surface in a rational hive according to the embodiment of FIG. 7.

The temperature distribution (isothermal contour) inside a standard hive (in deep nest and vertical double deep) is far from being optimized. The gradient of the brood is considerable and the distance between the isothermal lines is extremely small. The brood is layered over the combs at the incubation acceptance range (from 26° to 36°) and the most part of the brood surface is set into the lower temperature range (FIG. 1B—surface to brood temperature of known hives). The trapezoidal frame (e.g. FIG. 9) allows to move the frame barycenter upwards and increases the brood surface with higher temperature. FIG. 7A shows the brood temperature versus the brood surface in a rational hive according to the embodiment of FIG. 7.

As can be immediately seen, the 80% of the brood surface is at 34° C. and the rest of the brood surface is higher than 28° C. The brood nest is in the perfect situation for incubation and in the maximum brood acceptable range. In other terms, in the invention configuration, the temperature is stratified (FIGS. 4A and 7A) with large space between isothermal lines. The major part of the brood is set into the maximal brood acceptable range (FIG. 4A); the use of the trapezoidal optimized frame allows to set the major part of the brood surface into the maximal temperature range, (FIG. 7A) also for large brood deposition areas (300 dm$^2$).

Comparison between the resultant surface/temperature (FIGS. 1B, 4A and 7A) synthetizes the effect of the hive over the brood incubation temperature. Moving back to trapezoidal comb frames 6, the middle height (H/2) divides the frame into two regions, namely an upper area 8a and a lower area 8b of different surface. The ratio between the upper surface (with respect to the middle frame height) and the lower surface can be calculated and optimized. The ratio may be seen as an indication of the advantage obtained to enhance the brood surface temperature with respect to a rectangular frame.

A ratio between the upper area 8a and the lower area 8b of the inner comb area 8 should be at least 1.05 and optionally at least 1.12 or greater. As previously mentioned, the comb frames 2 are housed into the nest comb box 2 parallel one with the other and having the respective inner comb areas 8 facing one another. The comb frames 2 lay vertically when in use in side by side relationship (see FIG. 2, for example).

A distance between a middle vertical plane of one comb frame 6 and a middle vertical plane of an adjacent comb frame 6 is substantially constant and included between 28 and 35 mm. This allows the bees to build the cells and to keep a sufficient space to move between the frames (e.g. about 8-12 mm once the cells are built, this is the well know bee-space concept).

A distance between a middle vertical plane of one comb frame and the lateral wall 3 of the nest comb box is substantially constant, too and included between 18 and 24 mm to allow the bees to build the cells on the frame side and then to pass in the remaining space.

Also, a distance between a lateral bar 7c; 7d of the bars 7 of each of the comb frames 6 and a lateral panel 3a; 3b; 3c; 3d of the box 2 should be substantially constant and included between 8 and 12 mm. This prevents that combs are built between the frames 6 and the box 2, but allows the bees to move there between.

The rational hive structure 1 additionally comprises a top cover 4 located in an upper portion of the hive structure to close an upper access to the hive structure itself. In certain embodiments (e.g. FIGS. 4, 7, 10 and 16) the top cover 4 directly closes the upper passage; no holes or cavities for putting into fluid communication the external environment with the inner cavity housing the brood chamber are present in the top cover 4 and/or between the top cover and the lateral wall 3. During summer, when external temperature is higher than the internal temperature of the brood chamber, in case of honey supers including a lot of honey, a small hollow might be exceptionally left (e.g. in the top cover). This small hollow does not allow bees to fly through and the bees may close it with wax if they consider it proper.

Figure 11:
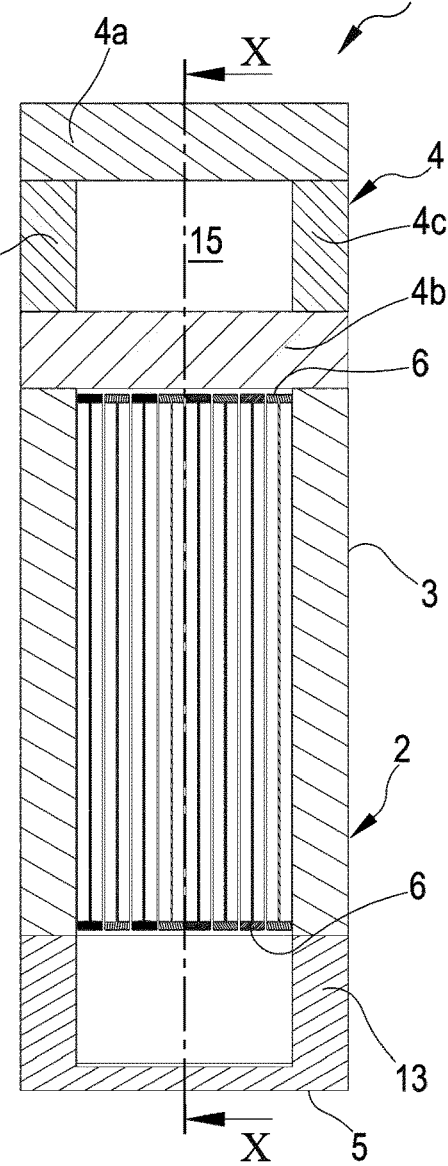
FIG. 11 shows a cross-sectional view of the hive of FIG. 10 taken along a second vertical plane orthogonal to the first plane (line XI-XI)
Figure 12:
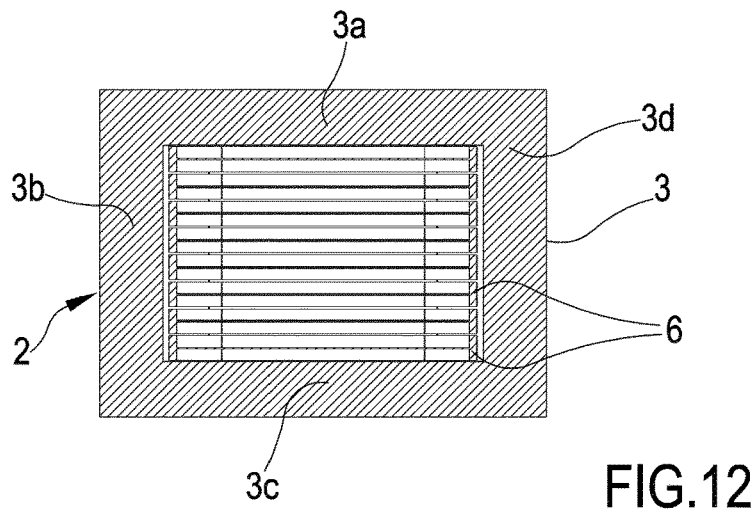
FIG. 12 a cross-sectional view of the hive of FIG. 10 taken along a horizontal plane (line XII-XII)

The top cover 4 may have an overall thickness of at least 10 mm, in particular of at least 20 mm and more in particular of at least 40 mm to provide proper thermal insulation. In the embodiment of FIG. 11, the top cover 4 is box shaped to include a closed air chamber 15 confined between top and bottom panels 4a, 4b and lateral wall panels 4c. Of course, the top cover 4 of FIG. 11 may be used in anyone of the other disclosed embodiments. FIGS. 1 and 13 show a hive including at least one honey super 9 placed in correspondence of the upper passage of the nest comb box 2. A honey super consists of a box 10 in which e.g. 8-10 frames 11 are hung. Standard or customized geometry of the super frame can be used. Western honeybees collect nectar and store the processed nectar in honeycomb, which they build on the frames.

When the honeycomb is full, the bees will reduce the moisture content of the honey to 12-18% moisture content before capping the comb with beeswax. Beekeepers will take the full honey supers and extract the honey. The box 10 has no holes or cavities for putting into fluid communication the external environment with an inner cavity of the box itself. More than one honey super may be used. In this configuration, the top cover 4 directly closes an upper part of the box 10, and in particular no holes or cavities for putting into fluid communication the external environment with the inner cavity housing the brood chamber are present in the top cover 4 and/or between the top cover and the box 10.

The rational hive structure according to the described embodiments, further comprises a bottom case 12 placed below the nest comb box 2; generally, though not essentially, the nest comb box and the bottom case 12 are separate and distinct elements, which may be coupled in use. Bottom case 12 comprises a respective auxiliary lateral wall 13 delimiting a bottom cavity (also the bottom case may be in tubular form); in use condition, the comb frames 6 are preferably not housed in the bottom cavity (see all figures), however, the bottom case 12 is into fluid communication with the nest comb box 2. With the exclusion of the previously described embodiment of FIG. 16 (having a closed bottom case/bottom cavity), the bottom case 12 comprises a bee entrance 14. The bee entrance 14, for example in the form of an elongated horizontal slot (of height about 8-16 mm, and preferably 12 mm), is at a distance D, in particular a vertical distance, from the comb frames 6 of at least 15 mm. The specified minimum distance has the aim to allow a proper air recirculation inside the hive. As indicated in all the figures, the distance is a vertical distance between the entrance 14 upper profile and a lower bar 7d of the comb frames 6. The distance D is less than 200 mm and particularly the distance is at least 100-120 mm. The beehive entrance 14 can be also alternatively shaped as duct or suitable shape. The entrance 14 is in the direction of the plurality of lateral bars of one side of the comb frames 6, i.e. the comb frames extend away from the bee hive entrance and the slot is transversal to the main plane of each comb frame 6. This is only optional: the beehive entrance 14 may be parallel to the main plane of each comb frame 6. Finally, the hive structure includes a lower closure element 5, which closes the lower passage of the auxiliary lateral wall 3. The lower closure element 5 may be separate from and a distinct element with respect to the bottom case 12, or the two elements may be made in a single piece depending on the design needs. The lower closure accepts the mite inspection board and an eventual net to allow ventilation and transportation.

Theoretical Background of the Invention

The described hive structure is different than the prior art. The inventors demonstrated the honey to brood equivalence is not an biological characteristic of the honeybee species: the honey to brood equivalence is related to the hive parameters and the local climatic conditions.

It was demonstrated that the honey to brood of standard hives can be largely modified by the criteria at the basis of the invention. Literature describes the colony rearing depending to bee average life or to pathologies or to intrinsic behaviors; however, according to prior art, the colony status was considered not to be related to the hive. The authors linked the population growth to the colony and hive interaction, highlighting the more sensitive physical and configuration parameters. The colony growing exponent is explicitly dependent to the hive dissipation, and it also depends to the hive geometrical parameters.

Another important inventor intuition is that the brood temperature is dependent from the hive characteristics. In a standard hive, the bees work opposing the physical constraint of the standard hive and they can barely adapt to it. The bees rise the new generations at the lowest temperature range, as the last chance to survive in a very inefficient hive. The brood temperature is far from optimal for bee synthesis because of the high brood surface at lower temperature (cold brood). Moreover, cold brood leads to a degenerative process producing weaker generations of bees. Differently, the invention allows the colony to manage the brood temperature and rise the new generation at the highest brood temperature range, resulting in better biological bee synthesis. The described critical hive configuration allows optimal temperature control by the bees themselves. The effects are:

a. optimal bee synthesis leading improvements, generation by generation;
b. reducing the honey to brood consumption and achieving larger brood surface;
c. extremely high numbers in bee population;
d. reducing the incubation time of the newborn bees;
e. reducing the parasite growing ratio;
f. reducing the worker bees needed into the nest respect the flying bees; and
g. enhancing the colony capability to self-select pathology resistance Notably, honeybees always perform active temperature control, but uniquely into the optimized hive the colony is induced to perform an optimal temperature control. An optimal temperature control means that the bees can continuously (in time-seasons) set the temperature within a nest distribution (volume, gradient) not possible to be observed in standard hives.

Because of the relation bee quality-temperature and because of other new phenomenon (e.g. the process to raise a new queen by the colony), the colony status follows divergent trajectories once reared in standard or optimized hive. In a short observation time (month/seasons), the colony develops faster with large population and lower honey consumption. During several seasons (years) observation, the colony becomes more resistant to parasites and pathologies, exhibiting a further increase of the surplus capability and a strong reduction in treatment requirement and parasites infestation reduction.

The long term effect of the optimized hive is the stability-survivability of the bee stocks respect the continuous decay or the stocks managed into standard hives. The effects of the hive structure are due to the optimal temperature control of the honey bee colony. With the optimal temperature control the inventors noted the following new effects:

1. The possibility to maintain the brood temperature with low thermal dissipation produces more brood for unit of honey consumed. The honey to brood is not constant and leads to more population production while reducing the bee work, and increasing the flying bee number (population split). The particular shape of the optimized hive allows to extend the brood surface into the best temperature range with less thermal cost (trapezoid-like frames or upper barycentric frame). This leads to enhance brood surface rearing.
2. The characteristics of the hive allows to generate an inner air stratification, almost isothermal, at the optimal bee temperature. This temperature distribution (power/volume/gradient) is intrinsically due to the optimized hive characteristics. This temperature distribution is obtained by the bees (or without the bees by eventually placing a heater into the hive) and origins the long term colony improvement and is one of the factors reducing the mite growing ratio.

The Measure of the Hive Performances in Terms of Dissipation and Temperature Gradient It is necessary to relate the critical hive property to the hive structural configuration. The measure of the critical hive property also allows to relate the hive structure to the hive-colony effects. It is not possible to consider uniquely theoretical relations between the critical hive property and the hive structure because of the complex and non-linear influence of the hive structural parameters. The hive property, which induces modifications in the bee colony are:

a) k thermal dissipation to unitary brood surface and unitary temperature difference at fixed or at maximum brood surface.
b) temperature gradient into the colony It is known that:

$$W = k \cdot \Delta T \cdot S$$

where

W is the thermal power to maintain the brood surface into the hive with a pre-set temperature difference respect to the environment;

k is the thermal dissipation to unitary brood surface and unitary temperature difference at fixed or at maximum brood surface;

$\Delta T$ is the pre-set temperature difference respect to the external environment;

S is the considered surface area (maximal brood surface).

The temperature gradient into the colony is linked to the thermal dissipation as result of the thermos-fluid dynamic problem. The temperature gradient at steady state into the nest can be measured during the k measurement. The hive is maintained in operative configuration, preserving the inner air ducts geometry due to the combs or hive structure.

A thermal power is imposed to the nest surface, obtaining a steady state thermal field with a measured environmental temperature difference. The provided necessary thermal power, as well as the nest temperature field, are then measured with an adequate number of inner sensors, so obtain the nest equivalent brood surface at the incubation temperature.

Using the above equation and the measure of S, $\Delta T$, and W, it is possible to calculate k. In standard hive the measure is repeated considering the maximal brood surface S=220 $dm^2$ and it is compared with the dissipation according to hives of the invention with the identical brood surface S. In case the radiator cannot maintain the range of bee incubation, the portion of the surface at incubation temperature is measured.

Figure 19:
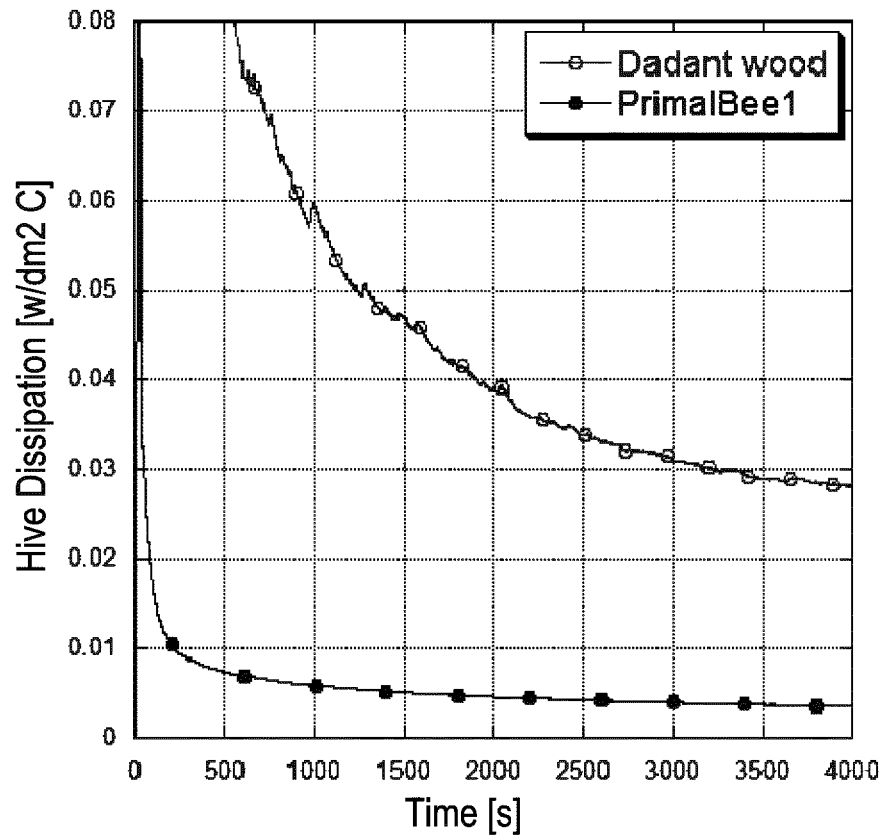
FIG. 19 shows time versus hive heat dissipation comparing a standard Dadant/Langstroth wood hive, with a hive according to the invention (PrimalBee system) obtained with an identical brood area and identical temperature difference to compare the transient thermal response to keep warm the brood.
Figure 20:
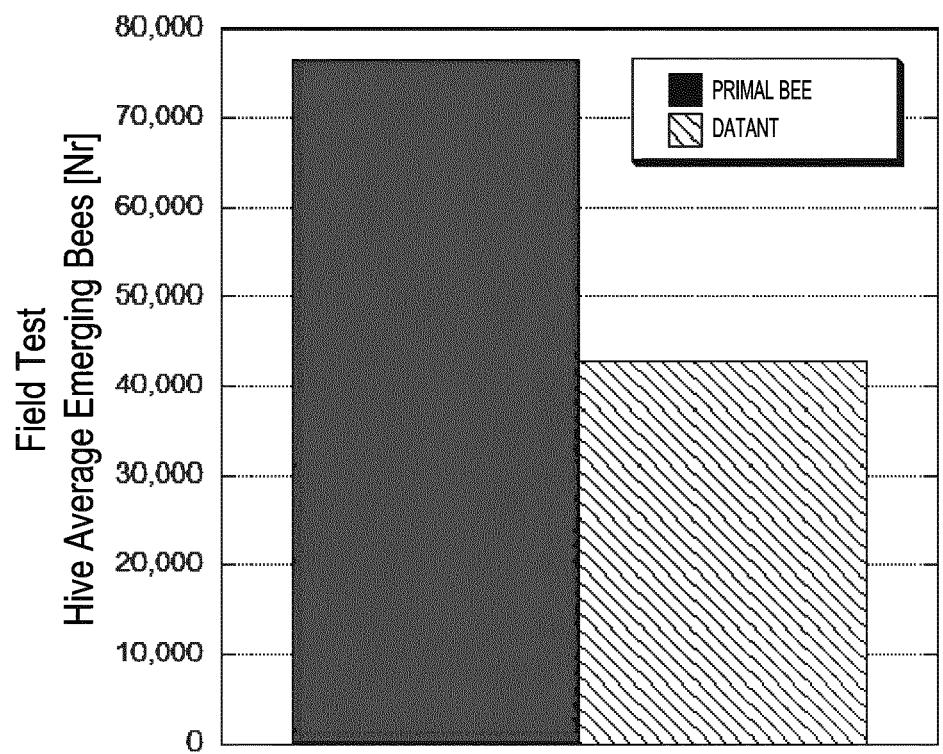
FIG. 20 shows the emerging bees (from brood combs)—average on 10 hives—data refers to prior art hives, namely Dadant, versus invention hives, namely Primal hive, when the data were collected and branded PrimalBee system.
Figure 21:
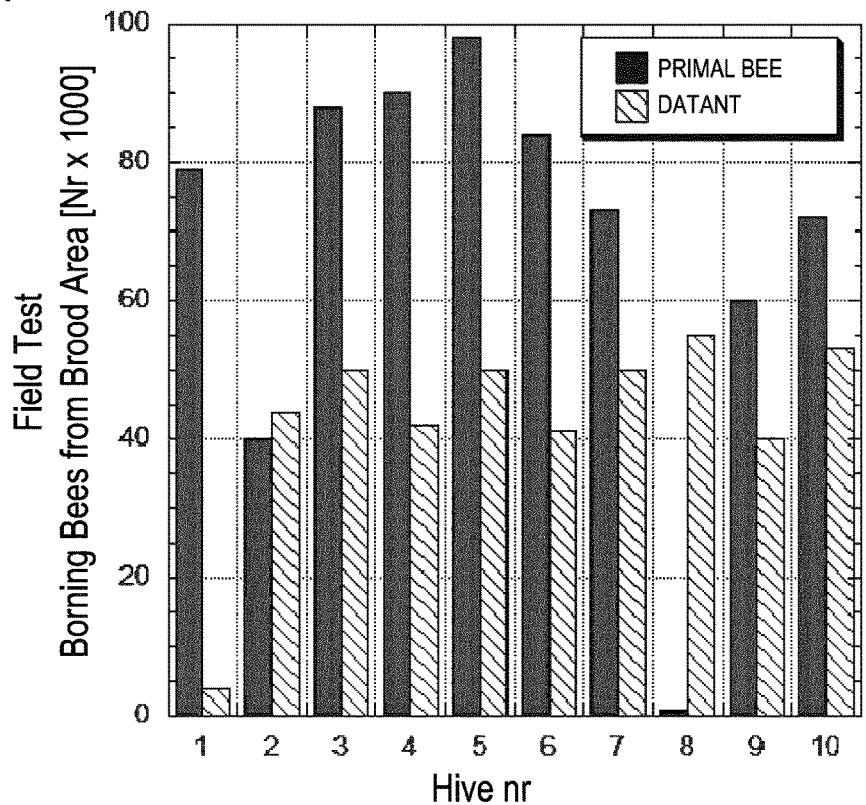
FIG. 21 shows colony emerging bees (from brood combs)—details for each hive—data refers to prior art hives, namely Dadant, versus invention hives, namely PrimalBee system; standard hive nr. 1 collapsed; PrimalBee system hive nr. 8 swarmed.
Figure 22:
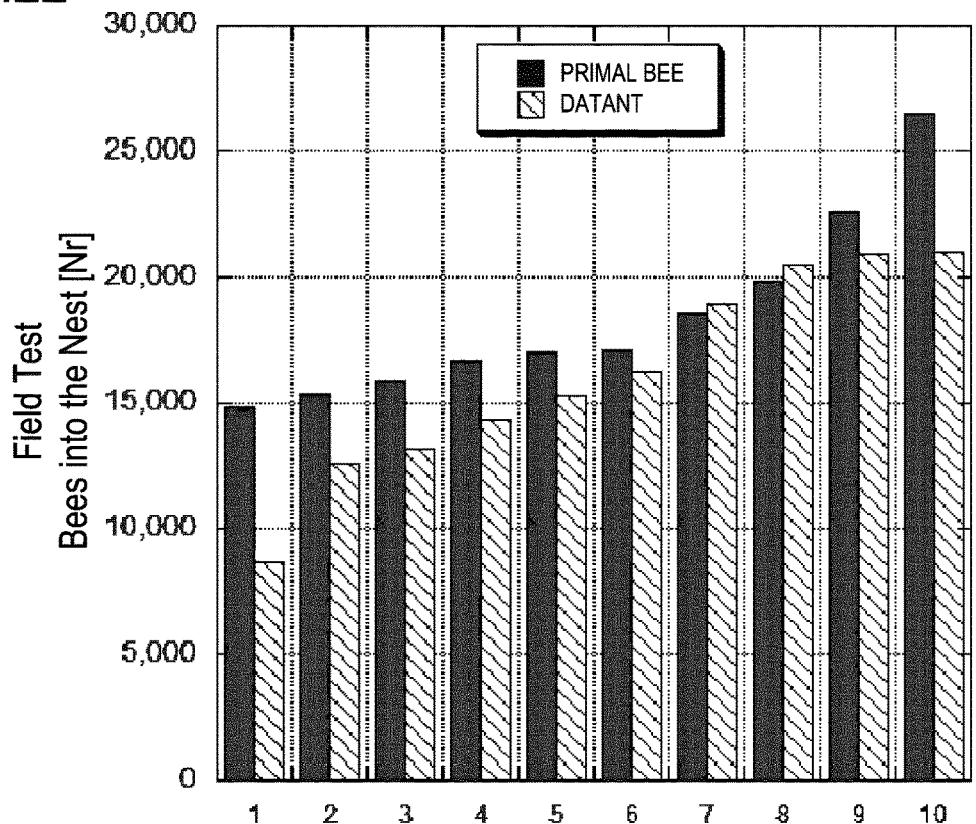
FIG. 22 shows nest bees (i.e. bees resting on the combs into the nest to warm it)—data refers to prior art hives, namely Dadant, versus invention hives, namely PrimalBee System.
Figure 23:
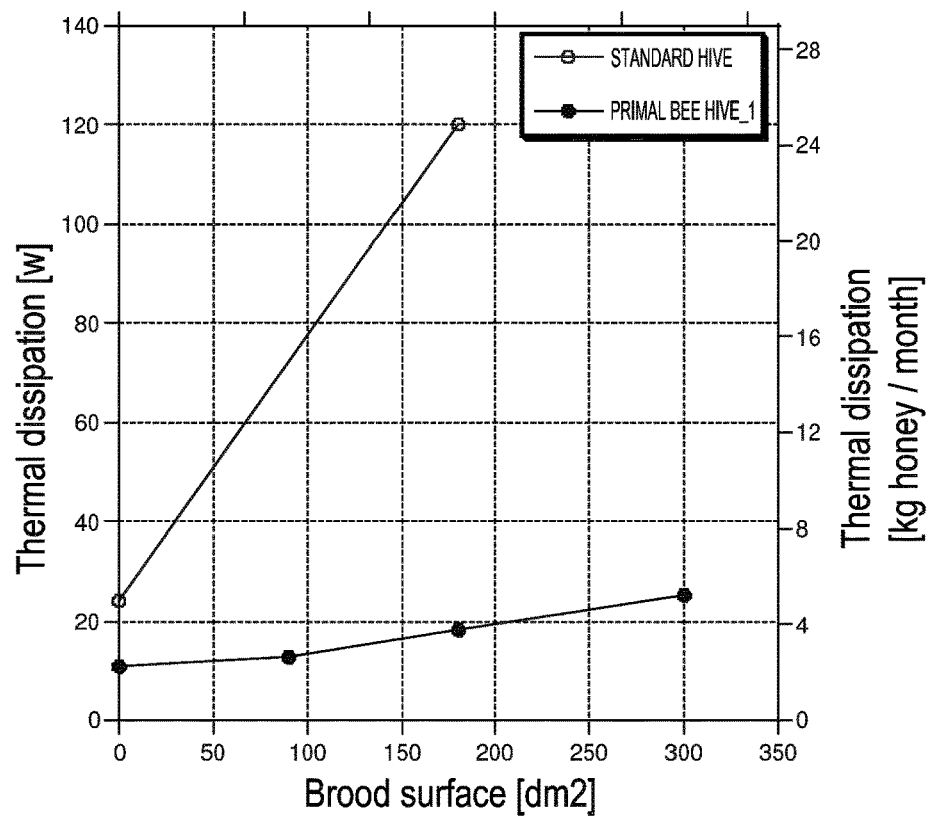
FIG. 23 shows brood surface versus thermal dissipation of standard hive versus PrimalBee hive according to the invention.
Figure 24:
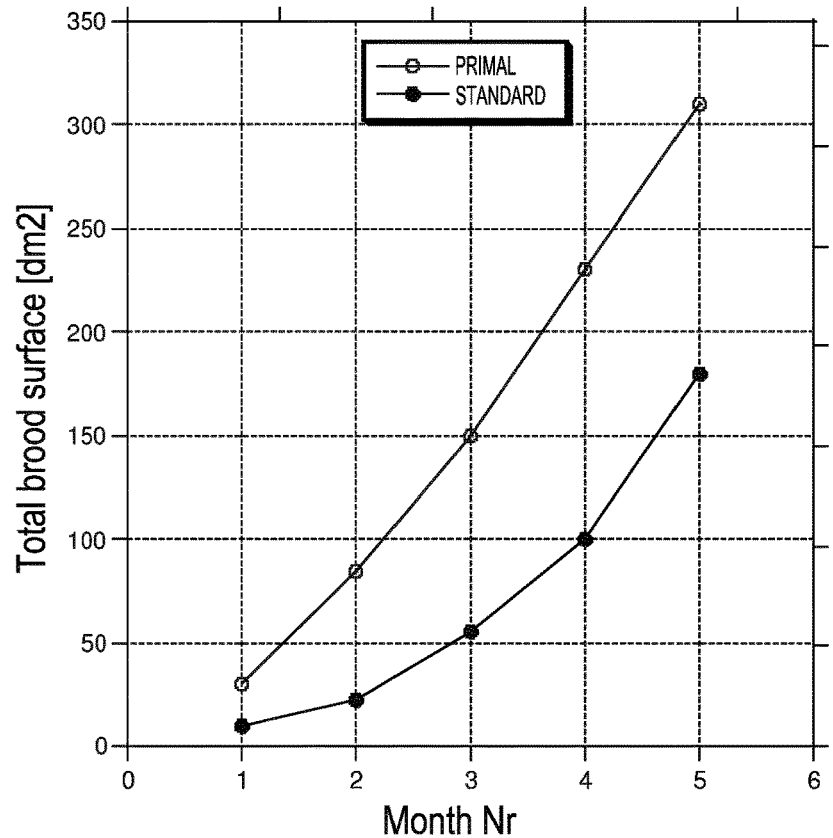
FIG. 24 shows a springtime population dynamic comparison in terms of month number versus total brood surface.
Figure 25:
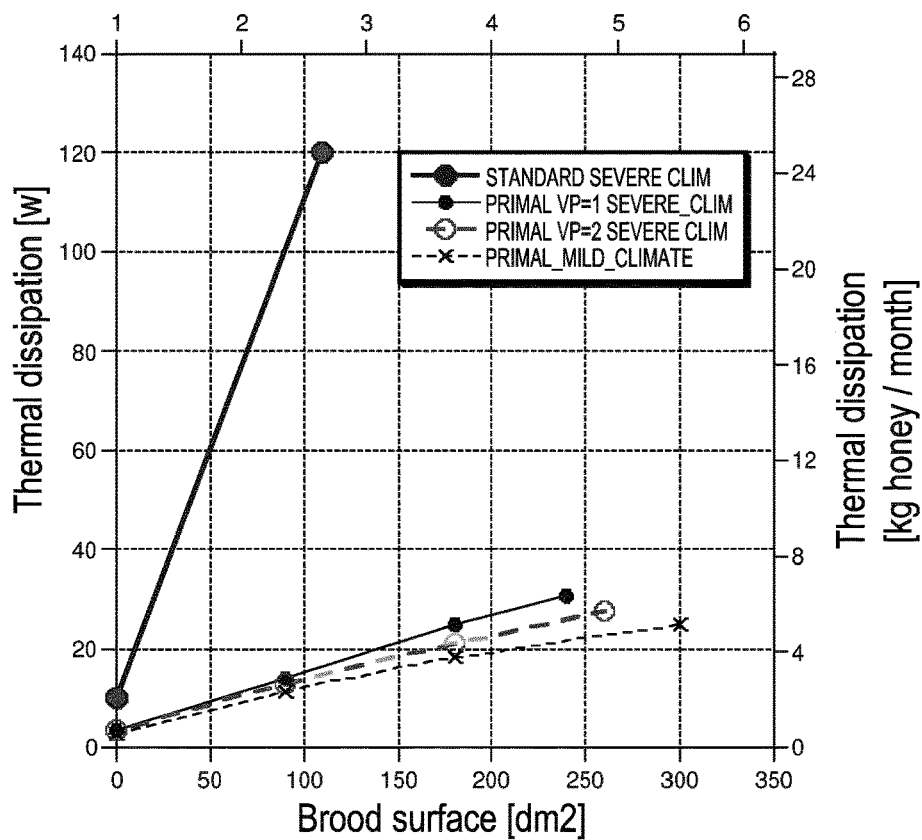
FIG. 25 shows climate influence over the colony maximal brood surface in terms of brood surface versus thermal dissipation.
Figure 26:
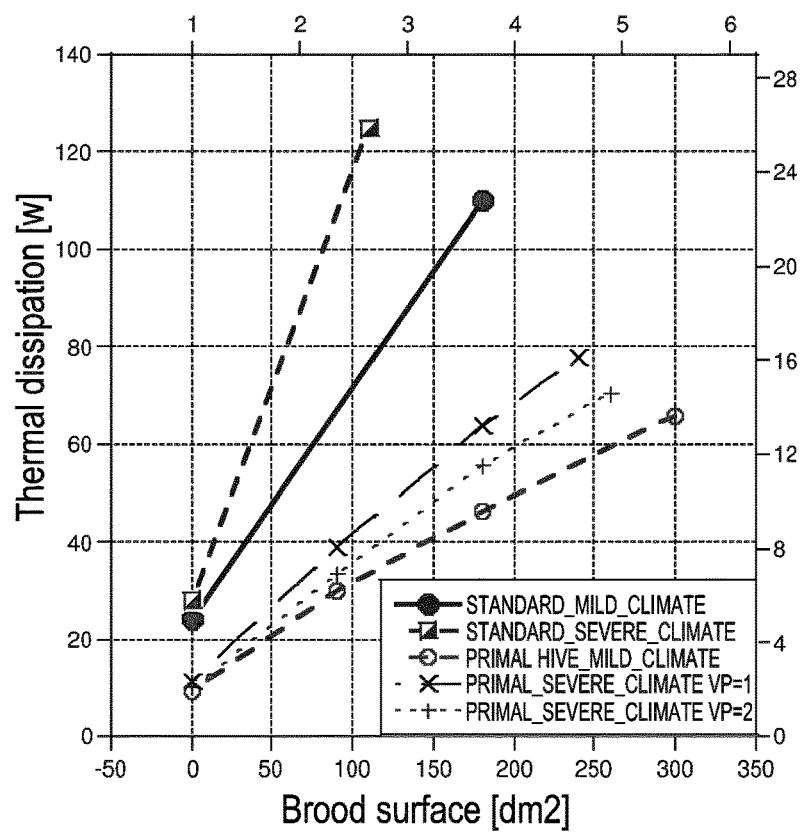
FIG. 26 shows the effect of the comb shape in terms of the brood surface versus the thermal dissipation.
Figure 28:
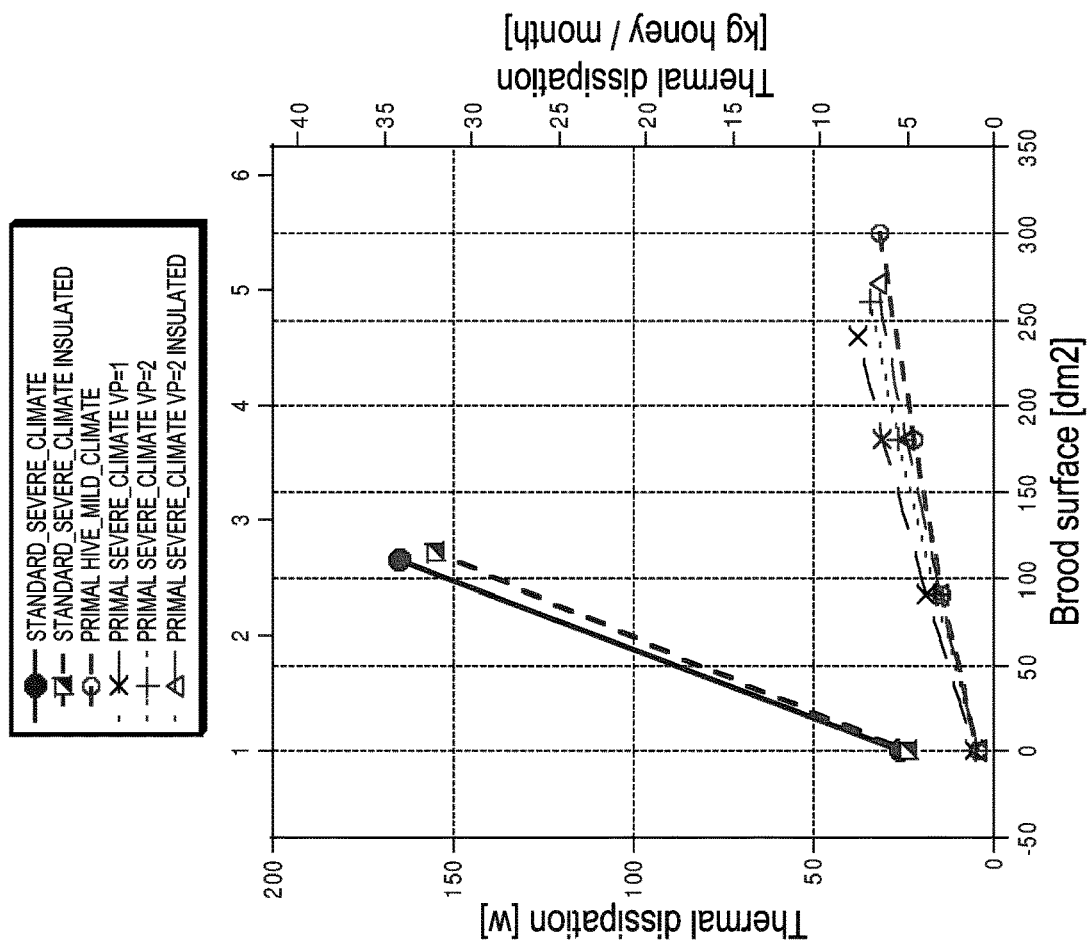
FIG. 28 shows climate influence over the colony maximal brood surface in terms of brood surface versus thermal dissipation.
Figure 27:
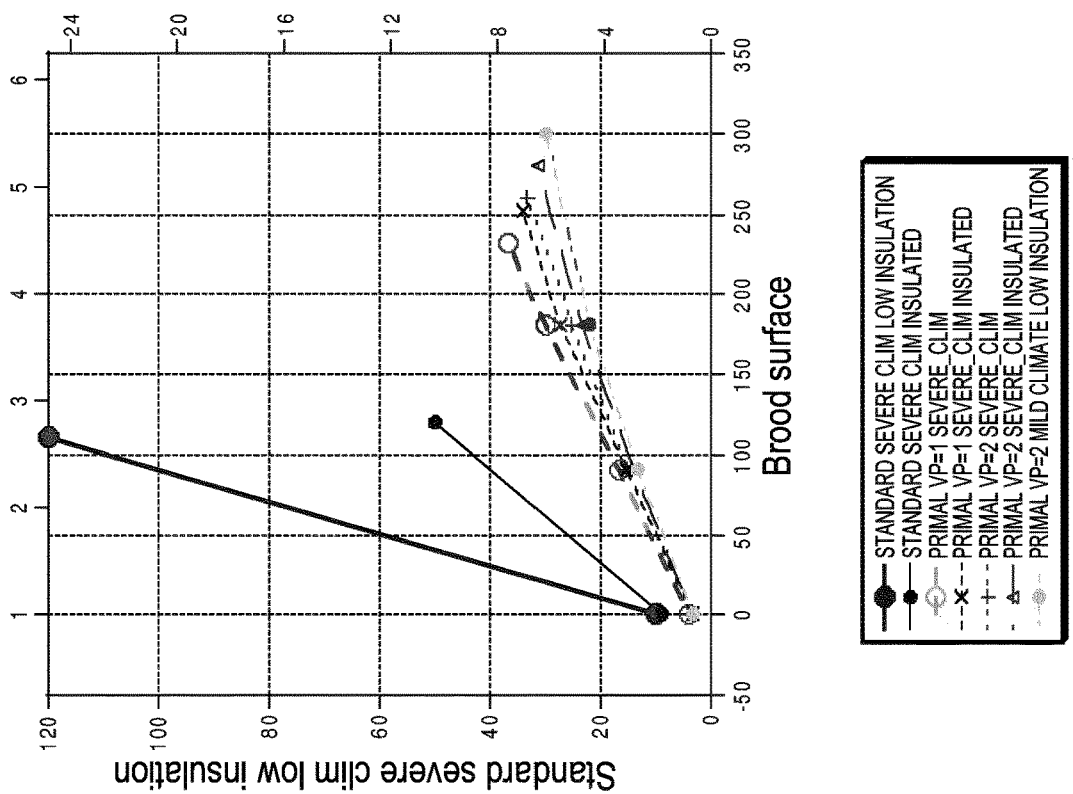
FIG. 27 shows the combined effect of the hive insulation and comb shape with respect to the standard hive response.

Efficiency is 1/k (bee effect proportionality) and is proportional to the invention benefits. Invention benefits are found in case of values lower than a specific k. FIG. 19 discloses the difference in terms of thermal performances between a Dadant wood hive of the prior art and a hive according to embodiments of the present invention. In FIG. 19 it is depicted the heat power for unit of brood area and unit of temperature difference in standard and PrimalBee System hive during a transient thermal cycle. The inventors understood that the benefits to the bee colony may be achieved in case the rational hive structure presents a hive thermal dissipation parameter less than 0.00600 [W/($dm^2 \cdot °C$)]; in particular the hive thermal dissipation parameter should be less than 0.005 [W/(dm$^2 \cdot °$ C.)], measured at 26° C. of imposed temperature difference.

The following table illustrates some experimental results.

| HIVE TYPE | Thermal power/(dm$^2$ ° C.) [W/(dm$^2 \cdot °$ C.)] |
|---|---|
| Dadant standard hive | 0.0224 |
| Langstroth standard hive | 0.0227 |
| Thermal dissipation parameter (limit) | Between 0.005 and 0.006 (e.g. 0.0058) |
| Present invention hive | 0.004; |

Example of Steady State Thermal Power Requirement:

Temperature difference nest/environment=30° C.; 220 dm$^2$ of nest surface;

Dadant thermal power=148 watt

Limit thermal power set by the invention=39.5 watt

Present invention hive thermal power=29 watt

The configuration limit corresponding to the hive dissipation parameter of about 0.006 [W/(dm$^{2°}$ C.)] allows experimentally to observe the merging of the positive effects into a certain (more limited) range of the colonies (e.g. test data in Europe, 20% of the tested strains).

The hives configurations below the critical limit allows to spread the benefits over the majority of the tested colonies (see below table: experimental test data).

| Hive type | Effects over bee population and mites |
|---|---|
| Dadant standard hive | NO |
| Limit | Yes in 20% of the colonies |
| Present invention hive | Yes in 95% of the colonies |

Measurement Instrument and Protocol

Measure of the Hive Thermal Dissipation

1) Boundary Conditions

During the measure the tested rational hive structure should be configured in a configuration mimicking a use configuration (a configuration where the bee colony is inside the hive in standard conditions). In particular:

1. The tested rational hive structure should use a cover or roof on place as in usual colony managing;

2. The tested rational hive structure should use other components on place (e.g. basis or pallets; or other hive bodies below e.g. in case of Langstroth double depth configuration, or with the entrance or bottom component in place as used during the colony managing);

3. Bee entrance should be opened as during the use with the bee colony in place;

4. Venting opened or closed as during the use with the bee colony in place;

5. The tested rational hive structure should be placed on flat ground or floor in vertical position as used in the field with the bee colony in place.

Test Conditions (Hive Structure):

a) The tested rational hive structure should use a structure without bee colony inside;

b) The tested rational hive structure should use a structure without natural or artificial nest combs, or nest wax sheet in any part of the hive structure;

c) The tested rational hive structure should use a structure without removable frames into the nest;

d) A radiator is placed in the tested rational hive structure in place of the nest frames/combs (see below); in case two or more nests are in the tested hive structure, only one nest is substituted with the radiator, the other nest/s, i.e. comb frames, are left in place;

e) Cables, connections, measures devices should not modify the closure of the tested rational hive structure e.g. roof or entrance or vents modifications, and its general configuration.

Test Environmental Conditions:

The measures will be performed in a controlled ambient having the following conditions:

f) Air/environment temperature: 8.0° C.;

g) Sun or heat radiation: absent;

h) Pressure: 98210 Pa (i.e. about the standard pressure at 250 meters above the sea level);

i) fluid: air;

j) free space surrounding the hive during the measure to do not generate or modify natural air stream;

k) wind: absent;

Radiator to be Placed into the Tested Rational Hive Structure for the Measure:

A radiator should be placed into the tested rational hive structure and in particular, the radiator will mimic the nest.

Radiator characteristics (see FIGS. 29-31):

The radiator 100 is build using copper sheets having each a thickness of 0.8 mm;

The radiator 100 is composed of a number of foils 101 to 108 identical to the number of removable frames or combs to be used into the tested rational hive structure; the foils are used to mimic the presence of the frames/combs into the hive body;

Each radiator foil should lie in the same plane of the corresponding frame/comb, in particular in the frame/comb plane of symmetry;

The radiator foils are assembled to a front support foil 110 by means of a continuous connection (i.e. brazing) ensuring thermal conductance (between connected parts) identical to the copper sheet used to build the foils; the front support foil 110 is in use parallel to the front face of the tested rational hive structure, in detail the front face placed on the same side of the hive bee entrance;

Radiator surface: the overall radiator is built to simulate the overall brood surface of a standard colony plus the frame contribute to the radiator size: e.g. in a total 220 dm$^2$ of brood for standard colony, a total 250 dm$^2$ of radiator frame foils (from 101 to 108) is used which includes the frame contribute of about 30 dm$^2$; the area of the front support foil 110 connecting the foils is not considered;

Radiator size: the radiator 100 respects the bee space distance from the tested rational hive structure walls; the foil surface is defined by the frames/combs middle plane copying the wax sheet and frames; the radiator foils extension and shape fits the outer perimeter of the removable frames or combs; the front support foil 110 connects the frame foils 101 to 108 along all their depth;

Radiator positioning: the radiator is suspended in the tested rational hive structure by touching the hive structure where the frames usually touch the hive structure; apart from that, the radiator respects the bee space and it is not in direct contact with other parts of the tested rational hive structure.

Heater Assembly Over the Radiator:

An electric heater 109 (Watlow—ULTRAMIC® Advanced Ceramic Heaters—from Watlow St. Louis (Mo.)) is used. The heater itself provides feedback to the controller.

Figures 29, 30, 31:
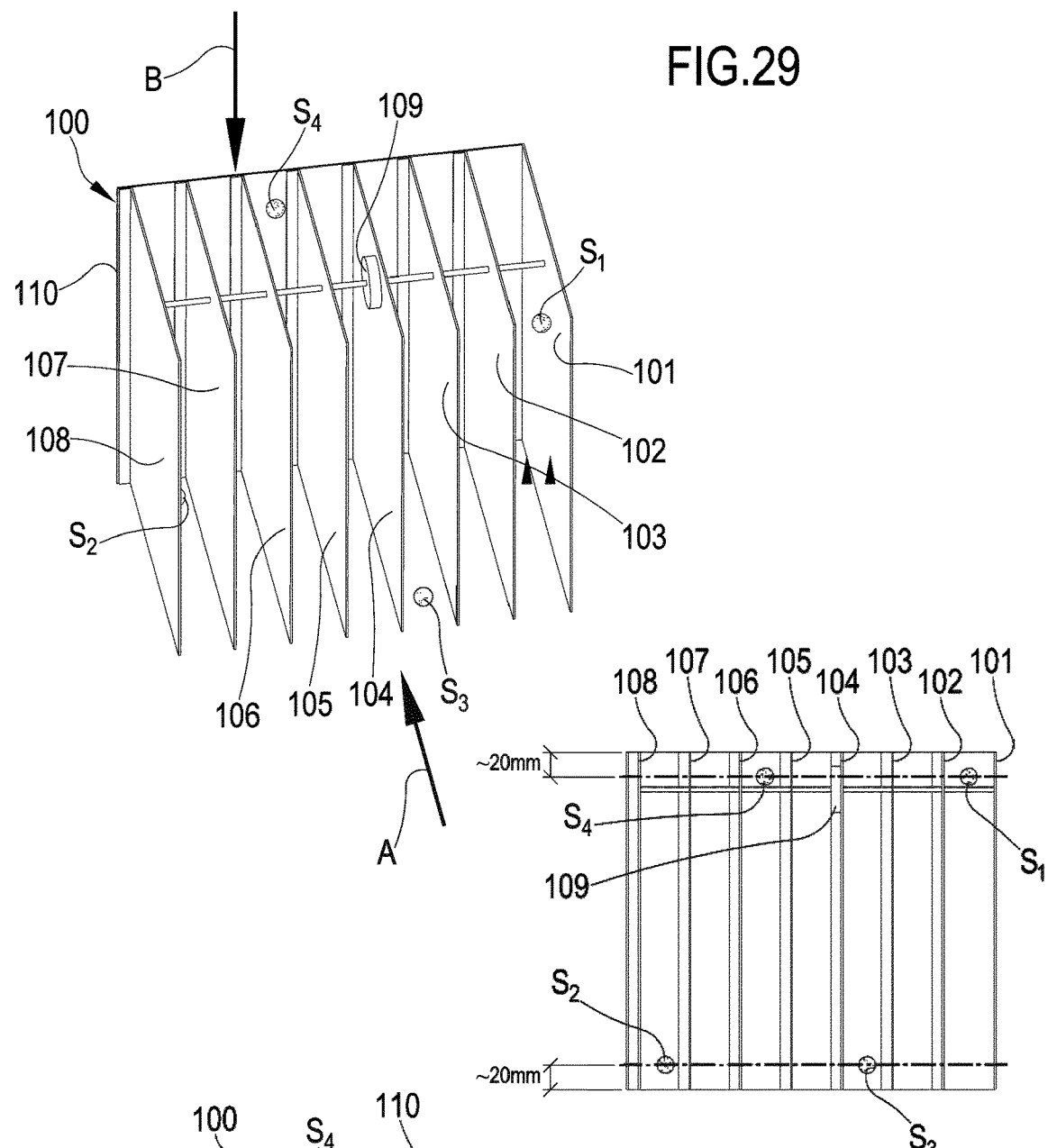
FIG. 29 shows a heater assembly to test rational hive structures and determining heat dissipation.
FIG. 30 shows a frontal view of the heater assembly seen from arrow A of FIG. 29.
FIG. 31 shows a top view of the heater assembly seen from arrow B of FIG. 29.

A heater is assembled over the radiator, into its central upper part (see FIG. 29). The heater 109 is positioned at the geometrical barycenter of the hive body top cross section. A face of the heater is in direct contact with the middle radiator foil (e.g. 104—depends on the number of foils), gaps and thermal discontinuities between the heater 109 and the foil 104 are minimized by the use of conductive glues so that the heat flux can flow through the foils. The electric heater 109 is placed into the tested rational hive structure into contact with the radiator. The radiator emulates the removable frames and the wax combs. A controller imposes a fixed temperature to the heater. The heater is the sole and exclusive heat source into the tested rational hive structure.

Temperature Sensors ($S_1$ to $S_5$):

Temperature sensors $S_1$ to $S_4$ are placed in air inside the hive (i.e. are not into contact with the radiator foils) at middle distance between respective radiator foils. First purpose of the temperature sensors inside the hive is to check the dimension of the isothermal air distribution at steady state during the experiment, sensors second purpose is to check the temperature delta inside the nest in case a isothermal air distribution should not be achieved. The number of temperature sensors inside the hive is 4, enough to reasonably detect the temperature profile at steady state into the tested rational hive structure.

A first sensor $S_1$ is positioned in the upper part of the tested rational hive structure between one lateral last foil 101 and the lateral penultimate foil 102 in a rear (opposite side of hive entrance) position. FIGS. 29, 30 and 31 clearly identify the first sensor placement. A second sensor $S_2$ is positioned in the lower part of the tested rational hive structure between one lateral last foil 108 and the lateral penultimate foil 107 in a front position at a side opposite to the side where the first sensor $S_1$ is placed. FIGS. 29, 30 and 31 clearly identify the second sensor placement. A third sensor $S_3$ is positioned in the lower part of the tested rational hive structure between two central foils 103-104 in a front position at a side opposite to the front support foil 110 and not on the same side of the heater. FIGS. 29, 30 and 31 clearly identify the third sensor placement. Note that each sensor is exactly spaced 20 mm in vertical and horizontal direction towards the inside of the radiator as specifically indicated in the drawings.

A fourth sensor $S_4$ is positioned in the radiator between two central foils 105-106 in a front upper position. FIGS. 29, 30 and 31 clearly identify the fourth sensor placement. All the four sensors are positioned at max 20 mm inside the radiator as better explained by the FIGS. 29, 30, 31. A fifth temperature sensor $S_5$ is placed outside the hive, into the environment, to provide the constant measure of the outside temperature; this sensor is placed far from any (heat) perturbation.

Measure Concept—Reach the Steady State

The thermal power W absorbed by the heater to reach the temperature increment of +26° C. with respect to the external environment temperature is measured. In case the external temperature is 8° C., the absorbed power W is measured when the sensors indicate a temperature of 34° C. In particular, the temperature increment (Δ26° C.) should be reached by all the sensors, meaning that the absorbed thermal power is measured when the last sensor reaches the imposed delta. At steady state, the isotherm profile into the hive body at temperature difference of +26° C. is identified using the temperature sensor output signals. In general terms, the total surface S of the radiator foils intercepted by the isotherm volume at temperature ΔT=26° C. is calculated as follows:

for each sensor there are always two foils, consider the most external foil from each sensor at ΔT=26° C. isotherm, including all the foils emulating the frames in between and excluding the connecting front foil; symmetry allowed;

consider the double side (right/left) contribute of the single foil, excluding the portion of the foil emulating the frame thickness;

sum of the all sub surfaces for the whole foils number to obtain a surface value S.

Then, W (absorbed thermal power when the last sensor determines a ΔT=26° C.), S (determined surface value), ΔT=26° C. are used to obtain the tested hive structure thermal dissipation.

The thermal dissipation ($k_w$) is calculated as:

$$k_w = \frac{W}{(\Delta T° \cdot S)}$$

$$k_w = [W/(dm^2 \; ° \; C.)]$$

In some standard hive configurations, it is impossible to reach the ΔT=26° C. due to the air dissipation. In this case, evidently the thermal dissipation is enormous because the real isothermal surface S is very small even not intercepted by the prescribed sensors position. In some kind of nests, due to their shapes, two radiators must be built to achieve the S value of 220 $dm^2$.

Experimental Data (Field Test)

The field test consisted into an experimental comparison of the honeybee colony response to the growth into the standard hive vs optimized hive (i.e. according to described embodiments of the invention). Multiple field tests were carried out considering different climatic regions and hive configurations. The field tests were so implemented. Two groups of 10 hives each, standard and optimized, were prepared. The initial colonies were as much identical as possible, considering strains, supplier, population, infestation. An identical managing protocol, including chemical treatments, nutrition, etc. was decided. The two hive groups were placed into the same environment. Honeybee colony and parasite brood and population were measured for two years. A long term observation was required to obtain a first full development of both groups. The measurements were made with objective methods, considering automatic bee flight counter, pictures of the nest and further computing of the bees over the combs and brood extension.

Field test 1: standard vs optimized hives—MILD CLIMATE, 45° latitude, standard bee strain, 250 masl (meters at sea level)

TABLE 1.1

(Best performances of both groups only)

MILD CLIMATE COMPARATIVE TEST RESULTS

| Hive # nr | Hive type | Lateral wall thickness - conductivity mm - W/m · k | Population Adimensionalized to standard pop. | Infestation Varroa mite | Peak seasonal brood surface $dm^2$ |
|---|---|---|---|---|---|
| 1.1 | Langstroth standard | 20 - 0.2 | 1 | no positive effects | 150 |
| 1.2 | Langstroth standard | 50 - 0.2 | 1 | no positive effects | 150 |
| 1.3 | Langstroth standard | 100 - 0.15 | 1 | no positive effects | 150 |
| 2.1 | PrimalBee vp1 | 20 - 0.1 | 1.2 | positive effects | 180 |
| 2.2 | PrimalBee vp1 | 50 - 0.1 | 1.3 | positive effects | 195 |
| 3.1 | PrimalBee vp2 | 20 - 0.1 | 2.2 | positive effects | 210 |
| 3.2 | PrimalBee vp2 | 50 - 0.1 | 2.4 | positive effects | 250 |
| 3.3 | PrimalBee vp2 | 75 - 0.1 | 2.7 | positive effects | 280 |
| 3.4 | PrimalBee vp2 | 100 - 0.1 | 3 | positive effects | 300 |

Langstroth standard: prior art hives;

PrimalBee vp1: hives according to the invention with comb frames having height extension substantially matching base extension;

PrimalBee vp2: hives according to the invention with comb frames having height extension substantially twice the base extension.

Relevant observations: the max brood surface of PrimalBee vp2 is 300 $dm^2$ corresponding to a new value with respect to maximum value known in literature (200 $dm^2$). Mites' development was heavily reduced in optimized hive, namely 80:1 ratio measured by sugar and alcohol tests and obtained with formic acid treatment exclusively admitted into the managing protocol. The wall thickness highly improved the performances of the optimized hive, and did not improve at all the performances of the standard hive. Into the optimized hive group, the constructive parameters affect the performance (vp1 vs vp2).

Field test 2: standard vs optimized hives—SEVERE CLIMATE, 45° latitude, standard bee strain, 800 to 1600 masl Langstroth standard: prior art hives;

PrimalBee vp1: hives according to the invention with comb frames having height extension substantially matching base extension;

PrimalBee vp2: hives according to the invention with comb frames having height extension substantially twice the base extension.

Relevant observations: the colony in the standard hive is severely disadvantaged by cold climates. The optimized hive is much less affected by the climate and further provides positive effects against the mite development. Combination of wall thickness and comb shape can further optimize the colony response by the optimized hive. The observed population difference were between 3 and 5 times in favor of the optimized hive.

TABLE 1.2

SEVERE CLIMATE COMPARATIVE TEST RESULTS

| Hive # nr | Hive type | Lateral wall thickness - conductivity mm - W/m · k | Population Adimensionalized to standard pop. | infestation varroa mite | Max seasonal brood surface $dm^2$ |
|---|---|---|---|---|---|
| 1.1 | Langstroth standard | 20 - 0.2 | 0.5 | no positive effects | 75 |
| 1.2 | Langstroth standard | 50 - 0.2 | 0.5 | no positive effects | 80 |
| 1.3 | Langstroth standard | 100 - 0.15 | 0.5 | no positive effects | 80 |
| 2.1 | PrimalBee vp1 | 20 - 0.1 | 0.6 | positive effects | 150 |
| 2.2 | PrimalBee vp1 | 50 - 0.1 | 0.9 | positive effects | 165 |
| 3.1 | PrimalBee vp2 | 20 - 0.1 | 1.5 | positive effects | 180 |
| 3.2 | PrimalBee vp2 | 50 - 0.1 | 1.7 | positive effects | 200 |
| 3.3 | PrimalBee vp2 | 75 - 0.1 | 2.3 | positive effects | 265 |
| 3.4 | PrimalBee vp2 | 100 - 0.1 | 2.7 | positive effects | 290 |

TABLE 1.3

Formic acid used during the hive managing
The 65% or 85% formic acid project story

| Hive Group | Formic acid solution [g] | Formic acid solution [ml] | Formic acid % | Formic acid [g] | Water [g] | External temperature [° C.] |
|---|---|---|---|---|---|---|
| PrimalBee (invention) | 340 | 297 | 65% | 235.5 | 104.5 | >15 |
| PrimalBee (invention) | 360 | 315 | 65% | 250 | 110 | <15 |
| Dadant/Langstroth | 720 | 606 | 85% | 628.5 | 91.5 | >15 |
| Standard suggested qty (as comparision) | 657 | 580 | 60% | 424.5 | 232 | >15 |

TABLE 1.4

Apiary development after test ending

| Hive type | Brood surface $dm^2$ min | Brood surface $dm^2$ max | Total comb surface (nest + super) $dm^2$ min | max | Treatment |
|---|---|---|---|---|---|
| PrimalBee (invention) | 200 | 290 | 410 | 710 | not treated |
| Dadant/Langstroth (prior art) | 30 | 70 | 80 | 120 | heavy chemical treatment to avoid colony loss and reinforcement from other colonies |

TABLE 1.5

Field test Lugano May 2016 Nest Bees and Brood surface

| Hive type | Hive code | Brood surface $dm^2$ | Emerging bees nr | Nest bees nr | |
|---|---|---|---|---|---|
| PrimalBee (invention) | R8 | 166 | 79'818 | 14'800 | |
| PrimalBee (invention) | S10 | 83 | 40'143 | 15'300 | |
| PrimalBee (invention) | R5 | 183 | 88'034 | 15'800 | |
| PrimalBee (invention) | R1 | 188 | 90'554 | 16'700 | |
| PrimalBee (invention) | S12 | 204 | 98'022 | 17'000 | |
| PrimalBee (invention) | R6 | 177 | 84'953 | 17'100 | |
| PrimalBee (invention) | S7 | 152 | 73'283 | 18'600 | |
| PrimalBee (invention) | 8 | 2 | 934 | 19'800 | swarmed |
| PrimalBee (invention) | R2 | 125 | 60'214 | 22'600 | |
| PrimalBee (invention) | S1 | 151 | 72'817 | 26'500 | |
| Total | | | 688'771 | 184'200 | |
| Dadant/Langstroth | P17 | 11 | 4'552 | 8'710 | collapsed |
| Dadant/Langstroth | P8 | 103 | 44'156 | 12'570 | |
| Dadant/Langstroth | P10 | 119 | 50'984 | 13'165 | |
| Dadant/Langstroth | P3 | 99 | 42'335 | 14'370 | |
| Dadant/Langstroth | P9 | 119 | 50'984 | 15'255 | |
| Dadant/Langstroth | P14 | 97 | 41'425 | 16'230 | |
| Dadant/Langstroth | P1 | 117 | 50'074 | 18'900 | |
| Dadant/Langstroth | P5 | 131 | 55'992 | 20'490 | |
| Dadant/Langstroth | P16 | 96 | 40'970 | 20'920 | |
| Dadant/Langstroth | P12 | 126 | 53'716 | 20'990 | |
| Total | | | 435'189 | 161'600 | |

Advantages of Some Described Embodiments

The described hive structures positively affect the colony population dynamics (unlikely to occur with standard hives). The positive influences are substantially obtained in any climatic region. The colony overall population may increase with respect to the standard hive up to three times. Moreover, increase of the overall population is seen in all seasons, as well as increase of foragers bee population. Increase of the brood surface in respect to standard colonies with identical population was observed. Increase of the maximal season brood surface and increase of the brood surface was achieved in any time during the season.

The optimized hive provided increased robustness of the brood to suddenly temperature drops. Novelty in literature, brood surfaces in hives according to the invention were experimentally measured up to 300 dm². The optimized hive provided increased possibility to produce artificial swarms and extension of the replication period. Indeed, a larger colony population, a reduced mortality and infestation, with faster build up, and a less overall work for the colony the invention allow to reproduce artificial swarms at a highest ratio 8:1.

The optimized hive provided modification of the ratio between bees into the nest and flying bees in favor of the flying bees and a natural modification of the ratio between drones and workers at favor of workers. Presence of drones into the colony also in winter could be observed, (overwintering drones in cold climates—no brood). The bee population increases the surplus and pollination capability and the fly activity by extension of the daily flight hours, increase of the flight intensity, increase of the flight speed. Increased surplus capability was recorded in cold and extreme climates (mountain regions, northern climates, etc.), too.

Additionally, reduced surplus consumption due to quick climatic changes was obtained. The hive caused a huge reduction in *Varroa* mite growing ratio (80:1 as field test data) and higher resistance other pests (e.g. fungus, etc.), increased colony resistance to *Varroa* mite at short term and further increase in long term. High reduction of mite infestation in drone cells was achieved and no drone cell cutting required as *Varroa* managing strategy. At the same time, a stronger colony has major defensive attitude against small beetle or *Vespa velutina* or other predators. A reduction of artificial nutrition consequent to higher surplus income and due to the higher optimized hive efficiency was observed. High reduction (i.e. disappearing) of robbery between colonies with high population differences as a consequence of increased pollen stores into the colony was obtained. Managing time and cost were significantly reduced and new managing techniques become possible, in particular managing of the colony with formic acid only. In other terms, strong reduction in chemical requirement, both in frequency and quantity, with respect practice/literature is necessary with possibility to migrate to pure chemical free. This additionally allowed increased formic acid efficacy against *Varroa* mite. The colonies response to parasite and colonies performances were improved due to bee breed differences obtained by highly reducing time and efficacy of the selection.

When a number of hives according to the described embodiments is managed properly, the mentioned advantages manifest through time (years) with a continuous and progressive performance (parasites and super) improvement. The improvement is due to the automatic increase of the genetic quality of the colony. The invention also increased colony strength to extreme climates, with increased capability to over wintering in cold climates, increased colony strength to strong temperature variations while brood is present, superior spring build up, increased survivability to forage less periods, adaptability to extreme climates regions and adaptability to high temperature regions.

A strong reduction of colony loss in short and long term period was observed with major colony strength to transportation stress and reduction in transportation mortality. The improvement management of the optimal temperature range inside the hive results in an extension of the warm brood surface into the nest and through time (night-day-seasons), a decrease of the temperature gradient, a reduced nest temperature variability due to environmental causes, a better stratification of the nest temperature and a larger distance between isothermal lines. Thereby those other effects were observed: less bees than usual can better control the internal hive temperature, large portion of brood uncovered by bees in healthy and populated colonies and less brood contamination by the mites was obtained. Finally, a modification of the honey to brood equivalence in favor of the colony was possible.

A strong colony reduced the incubation time, increased bee work capability, obtained better protein synthesis in larva and pupa and increased capability to build wax combs during the all seasons (Beeswax comb build up was observed in winter time in north Italy).

The invention claimed is:

1. A rational hive structure comprising:
   a nest comb box delimiting a brood chamber for bees, the nest comb box including a lateral wall delimiting an inner cavity housing the brood chamber;
   a top cover located in an upper portion of the hive structure to close an upper access to the hive structure;
   a lower closure element located in a lower portion of the hive structure to close a bottom access to the hive structure;
   a plurality of comb frames in the form of substantially flat bodies extending in a main plane, each comb frame including peripheral element or bars delimiting at least part of an inner comb area, wherein the inner comb area has a one-side overall dimension of at least 15 dm2;
   wherein the rational hive structure presents a hive thermal dissipation parameter less than $0.00600$ $[W/(dm2 \cdot ° C.)]$, measured at 26° C. of imposed temperature difference.

2. The rational hive structure according to claim 1, wherein the comb frame has a polygonal structure, a rectangular structure or a trapezoidal structure, wherein the comb frame is symmetric with respect to a vertical axis and comprises a comb foundation sheet within the bars.

3. The rational hive structure according to claim 1, wherein the comb frame includes four bars connected to each other to define the comb frame, an upper bar being connected to a lower bar with the interposition of two respective lateral bars, said comb frame being removably housed into the nest comb box, wherein the upper and the lower bars are substantially parallel to each other, wherein the upper bar of the comb frame is configured to be received and supported by an upper side of the lateral wall of the nest comb box.

4. The rational hive structure according to claim 3, wherein the upper bar is longer than the lower bar and lateral bars have a substantially equivalent length, wherein at least one of the lateral bars is inclined with respect to the upper and lower bars to define an acute angle with respect to the lower bar.

5. The rational hive structure according to claim 1, wherein, when in use, the plurality of comb frames vertically lays in a side-by-side relationship, a distance between a middle vertical plane of one comb frame and a middle vertical plane of an adjacent comb frame being substantially constant and included between 28 and 35 mm, a distance between a middle vertical plane of one comb frame and the lateral wall of the nest comb box being substantially constant and included between 14 and 18 mm.

6. The rational hive structure according to claim 1, wherein, when in use, the comb frame has a geometric barycenter placed in an upper position with respect to half of the comb frame height and an overall horizontal dimension lower than a vertical overall dimension,
  wherein the comb frame has a height longer than a base, the height of the comb frame being at least 1.5 times the base.

7. The rational hive structure according to claim 1, wherein, when in use, a line along a middle height divides the inner comb area into an upper area and a lower area, a ratio between the upper area and the lower area of the inner comb area being at least 1.05, wherein the comb frame is trapezoidal with an upper base longer than a lower base and an angle frame of at least 3°.

8. The rational hive structure according to claim 1, wherein the overall dimension of the inner comb area of each comb frame is comprised between 15 and 28 dm2 and the overall dimension of the inner comb area of all the comb frames is higher than 100 dm2.

9. The rational hive structure according to claim 1, wherein the overall dimension of the inner comb area of all the comb frames is comprised between 200 and 300 dm2, the hive including between two and fifteen comb frames.

10. The rational hive structure according to claim 1, wherein the comb frames are housed into the nest comb box parallel one with the other, having respective inner comb areas facing one another and lay vertically when in use.

11. The rational hive structure according to claim 1, wherein the lateral wall delimiting the inner cavity housing the brood chamber includes four lateral panels delimiting a substantially parallelepiped inner cavity and the lateral wall has a heat transfer coefficient lower than 5 W/(m2·K), wherein a distance between a lateral bar of said bars of the comb frame and a lateral panel is substantially constant and included between 8 and 12 mm.

12. The rational hive structure according to claim 1, wherein the lateral wall has a minimum thickness higher than 30 mm, the lateral wall is made of wood, polyurethane or expanded polymers.

13. The rational hive structure according to claim 1, wherein the lateral wall delimiting the inner cavity housing the brood chamber includes four lateral panels delimiting a substantially parallelepiped inner cavity, two opposite lateral panels being parallel to one another, the other two lateral panels having a thickness increasing from an upper portion of the lateral wall towards the lower portion of the lateral wall, wherein the comb frames lay parallel to two opposite flat lateral panels of the lateral wall delimiting a parallelepiped inner cavity.

14. The rational hive structure according to claim 1, further including at least one honey super placed in correspondence of an upper passage of the nest comb box, wherein the honey super comprises a box and a plurality of frames for honey, said frames for honey being hung in the box, the box of the honey super having no holes or cavities for putting into fluid communication the external environment with an inner cavity of the box, the top cover directly closes an upper part of the box, no holes or cavities for putting into fluid communication the external environment with the brood chamber are present in the top cover and between the top cover and the box.

15. The rational hive structure according to claim 1, further comprising a bottom case placed below the nest comb box, the nest comb box and the bottom case being separate and distinct elements, wherein the bottom case comprises an auxiliary lateral wall delimiting a bottom cavity, when in use, the comb frames being not housed in the bottom cavity.

16. The rational hive structure according to claim 15, wherein the bottom case comprises a bee entrance, said bee entrance being at a vertical distance from the comb frames of at least 15 mm, said distance is less than 200 mm and is a vertical distance between the entrance and a lower bar of the comb frames, wherein the bee entrance is in the form of an elongated horizontal slot, a height of the slot being between 8 and 16 mm and the comb frames extend away from the bee entrance.

* * * * *